United States Patent [19]

Iwashima et al.

[11] Patent Number: 5,077,685
[45] Date of Patent: Dec. 31, 1991

[54] METHOD AND APPARATUS FOR SUPPORTING THE OPERATION UNDER RADIOACTIVE RAYS

[75] Inventors: Sumio Iwashima; Toshiaki Yoshinaga; Kouichi Ushiroda; Hiroshi Takano, all of Hitachi, Japan

[73] Assignee: Hitachi, Ltd., Tokyo, Japan

[21] Appl. No.: 578,352

[22] Filed: Sep. 6, 1990

[30] Foreign Application Priority Data

Sep. 11, 1989 [JP] Japan .................................. 1-232810

[51] Int. Cl.⁵ .............................................. G21C 17/00
[52] U.S. Cl. ..................................... 364/578; 376/463
[58] Field of Search .............. 364/578, 413.26, 474.24; 434/218; 376/245, 254, 463

[56] References Cited

U.S. PATENT DOCUMENTS 4,042,813 8/1977 Johnson ............................... 364/578
5,006,991 4/1991 Ohcoshi et al. ................. 364/474.24

FOREIGN PATENT DOCUMENTS 59-54985 3/1984 Japan .
60-120295 6/1985 Japan .
61212782 9/1989 Japan .

Primary Examiner—Salvatore Cangialosi
Attorney, Agent, or Firm—Antonelli, Terry, Stout & Kraus

[57] ABSTRACT

Radioactivity exposure amount of workcraftmen is obtained through simulation by using an operation processor when the workcraftmen carry out work operation within an area under controlled radioactivity. The movement of the workcraftmen carrying out work operation in the area under controlled radioactivity is simulated by making use of layout graphic data relating to the area. The radioactivity exposure amount of the workcraftmen is calculated in response to the simulated movement of the workcraftmen. The operation procedures of the target work operation for radioactivity exposure amount calculation is outputted from the operation processor, when the calculated radioactivity exposure amount satisfies a predetermined value.

34 Claims, 13 Drawing Sheets

FIG. 2
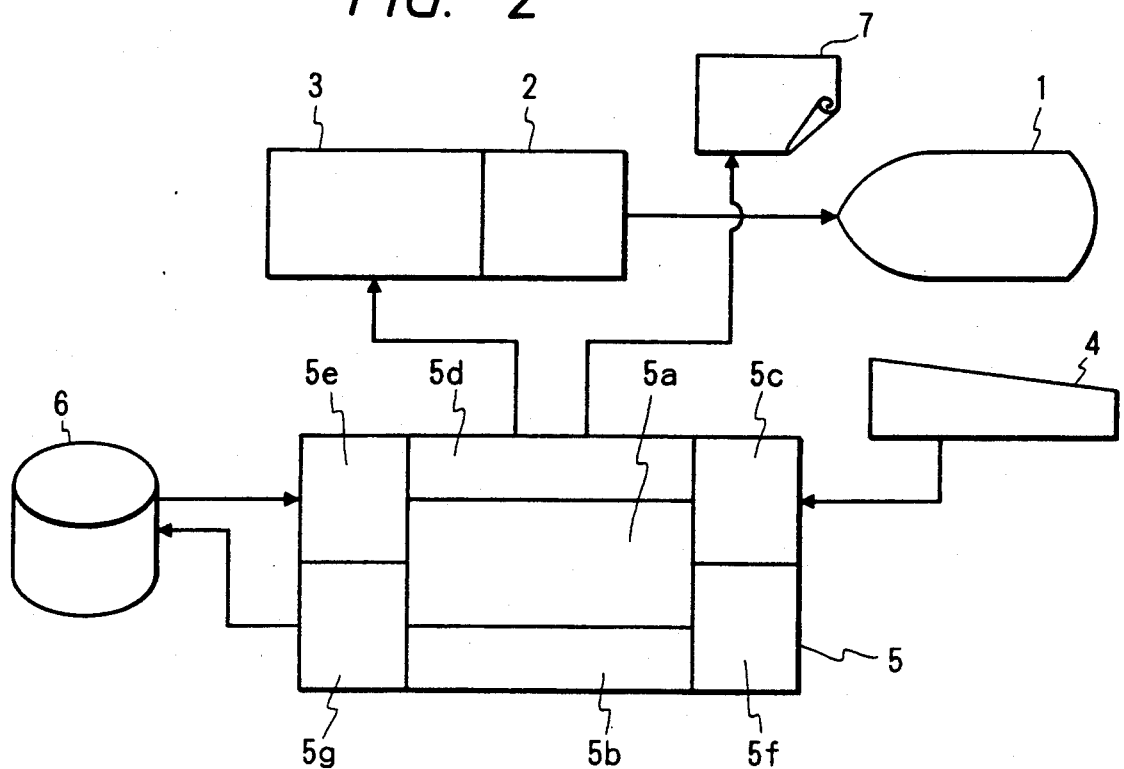
FIG. 3
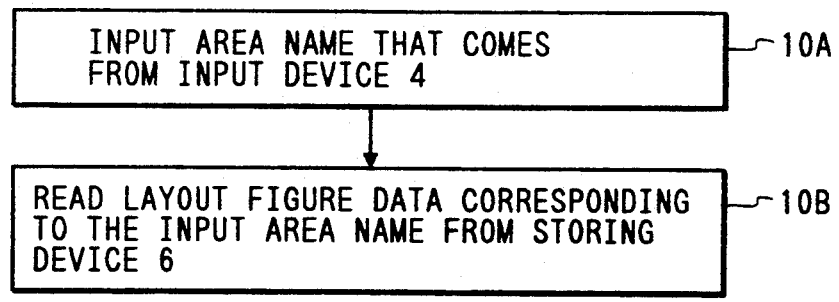
FIG. 4
| PLANT NAME | X |
|---|---|
| BUILDING NAME | R |
| AREA NAME | R5B |

FIG. 11

| NO. | WORK OPERATION PROCEDURE | WORK OPERATION INSTRUCTION |
|---|---|---|
| 1 | DRAIN WATER OF THE TANK | DRAIN WATER BY DRIVING PUMP |
| 2 | CLOSE THE VALVE | FASTEN ELECTRICALLY |
| 3 | FASTEN BOLTS OF BOTH SIDES OF THE STRAINER | TURN OFF BOLTS WITH A WRENCH |
| 4 | REMOVE THE STRAINER | REMOVE IT BY HANGING WITH A CHAIN BLOCK |
| 5 | INSTALL A NEW STRAINER | CARRY IN NEARBY WITH A PULLING CART AND SET IT BY BRINGING WITH A CHAIN BLOCK |
| 6 | FASTEN FLANGE BOLTS OF BOTH SIDES | FASTEN BOLTS WITH A WRENCH |
| 7 | OPEN THE VALVE | SAME AS NO. 2 |

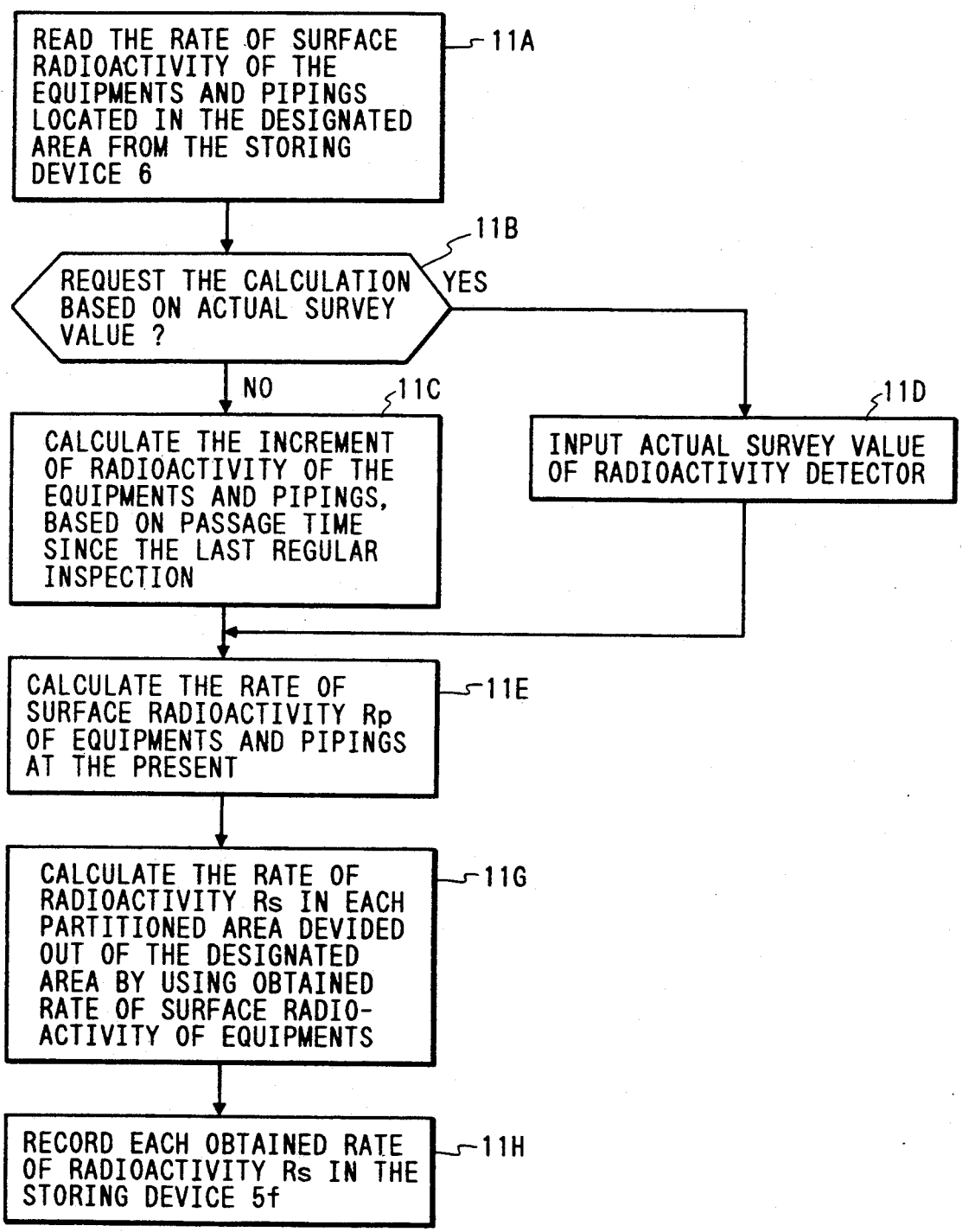

METHOD AND APPARATUS FOR SUPPORTING THE OPERATION UNDER RADIOACTIVE RAYS

BACKGROUND OF THE INVENTION

This invention relates to a method and an apparatus for supporting the operation under radioactive rays, and in particular relates to ones suited for obtaining radioactivity exposure amount through simulation.

The operation in regular inspections of an installation dealing with radioactive substances, e.g. a nuclear power plant, are carried out after confirming the schedule, procedure and process of the work operation by meeting before workers or work craftsmen enter the area with controlled radioactive rays.

Such a schedule of operation needs to be planned considering the radioactivity exposure amount received by the workers during the operation in the area with controlled radioactive rays. A method for estimating radioactivity exposure amount in planning such a schedule of operation is disclosed in Japanese Patent Application Kokai (Laid-Open) 60-120295. In this method, the total radioactivity exposure amount expected in the operation for this time is estimated by integrating secular change and evaluation factor for the operation with the actual total radioactivity exposure amount in the previous operation (the total radioactivity exposure amount from the beginning until the end of the operation). The evaluation factor for the operation is a degree of effect added to the whole operation for this time by an additional operation when the operation for this time can not be made in the same procedures as of the previous operation for presence of the additional operation. In the next place, the radioactivity amount of first schedule of the operation for each worker is calculated on the basis of the mean value of the newest actual data of contamination result and the determined operation time in the designated work operation area. Further, the radioactivity amount of second schedule of operation for the expected total radioactivity exposure amount is obtained on the basis of the determined operation time and the expected number of workers participating in the operation. The correction of the number of workers participating in the operation and the planning of the schedule of the operation are made, taking the radioactivity amount of the first and second schedules of the operation into account.

SUMMARY OF THE INVENTION

It is the first object of this invention to provide a method and an apparatus for supporting the operation under radioactive rays, according to which appropriate work procedures for the target operation can be obtained.

It is the second object of this invention to provide a method for supporting the operation under radioactive rays, according to which it is easy to determining the part where radioactivity exposure should be restricted when the radioactivity exposure amount does not satisfy a determined value.

It is the third object of this invention to provide a method for supporting the operation under radioactive rays, according to which it is easy to know the radioactivity amount in each structure disposed in the area with controlled radioactive rays where the target operation is carried out.

It is the fourth object of this invention to provide a method for supporting the operation under radioactive rays, according to which it is possible to recognize the movement of workers carrying out the target work operation.

The first characteristic of this invention attaining the first object resides in calculating the radioactivity exposure amount received by workers due to carrying out the target operation, which is carried out in the area with controlled radioactive rays where an apparatus dealing with radioactive substances is disposed and includes a plurality of procedures of work operation, by means of operation processing means, utilizing layout graphic data relating to the area with controlled radioactive rays and radioactive ray data of the structures contained in the layout graphic data, and outputting the procedures of the target operation from the operation processing means when the calculated radioactivity exposure amount satisfies a determined value.

The second characteristic of this invention attaining the second object resides in outputting the radioactivity exposure amount for each procedures contained in the target operation from the operation processing means when the obtained radioactivity exposure amount does not satisfy the determined value.

Further, the second object can be attained also by providing information relating to the radioactivity exposure amount for each small partitioned area which is divided out of the area where workers move in the area with controlled radioactive rays carrying out the target work operation.

The third characteristic of this invention attaining the third object resides in generating a first information for displaying each structure existing in the area with controlled radioactive rays as graphics by use of the layout graphic data, adding a second information for displaying the surface radioactivity rate of each of the structure to the first information, and displaying the first information to which the second information is added on display means.

The fourth characteristic of this invention attaining the fourth object resides in generating a first information for displaying the structures existing in the area with controlled radioactive rays within a plant housing where an apparatus dealing with radioactive substances is disposed as graphics on the bases of the layout graphic data showing the layout state of the structures in the area with controlled radioactive rays, generating a plurality of condition approximation graphic data of worker approximators for approximating the movements of the workers carrying out the target work operation in the area with controlled radioactive rays, generating a second information for displaying the worker approximators carrying out the target operation as graphics on the basis of the condition approximation graphic data, displaying the graphics of the structures and the graphics of the worker approximators for carrying out the target work operation on display means on the basis of the first and second information, and calculating the radioactivity exposure amount corresponding to the movements of the worker approximators.

According to the first characteristic, because the radioactivity exposure amount received by workers carrying out the target work operation including a plurality of procedures by use of layout graphic data of the area with controlled radioactive rays, a radioactivity exposure amount can be obtained with high precision taking the actual positional relation of a plurality of structures in the area with controlled radioactive rays and a plurality of procedures of work operation into account. Consequently, the determination is approximated further to one for the actual state as to whether the calculated radioactivity exposure amount satisfies a determined value or not, and the procedures of the target work operation obtained when the radioactivity exposure amount satisfies the determined value are appropriate.

According to the second characteristic, because the radioactivity exposure amount is obtained for each procedures of work operation, the procedures of operation increasing the radioactivity exposure amount can be recognized easily. The operator can easily devise measures for decreasing the radioactivity exposure amount in this corresponding procedures of work operation. Further, because output of the information concerning with the radioactivity exposure amount is made for each small partitioned area, a small partitioned area increasing the radioactivity exposure amount can be known easily.

According to the third characteristic, because the first information for displaying each structure in the area with controlled radioactive rays as graphics and the second information for displaying the surface radioactivity rate of each structure are displayed on the display means, the radioactivity amount of each structure can be recognized easily.

According to the fourth characteristic, the graphic of each structure and the graphics of the worker approximators carrying out the target operation are displayed and the radioactivity exposure amount are calculated corresponding to the movements of the graphic of the worker approximators, the movements of workers carrying out the target work operation can be recognized while calculating the radioactivity exposure amount.

BRIEF DESCRIPTION OF THE DRAWINGS

FIG. 2 is a view of constitution of the apparatus for supporting the operation under radioactive rays as an embodiment of this invention, FIG. 3 is a detailed explanation view of step 10 in FIG. 1, FIG. 4 is an explanation view of an example of the data, entered in step 10A in FIG. 3, FIG. 11 is an explanation view showing an example of the procedure and instruction of work operation entered in step 13D, FIG. 18 is a detailed explanation view showing another embodiment of step 11.

DETAILED DESCRIPTION OF THE PREFERRED EMBODIMENTS

Figure 1:
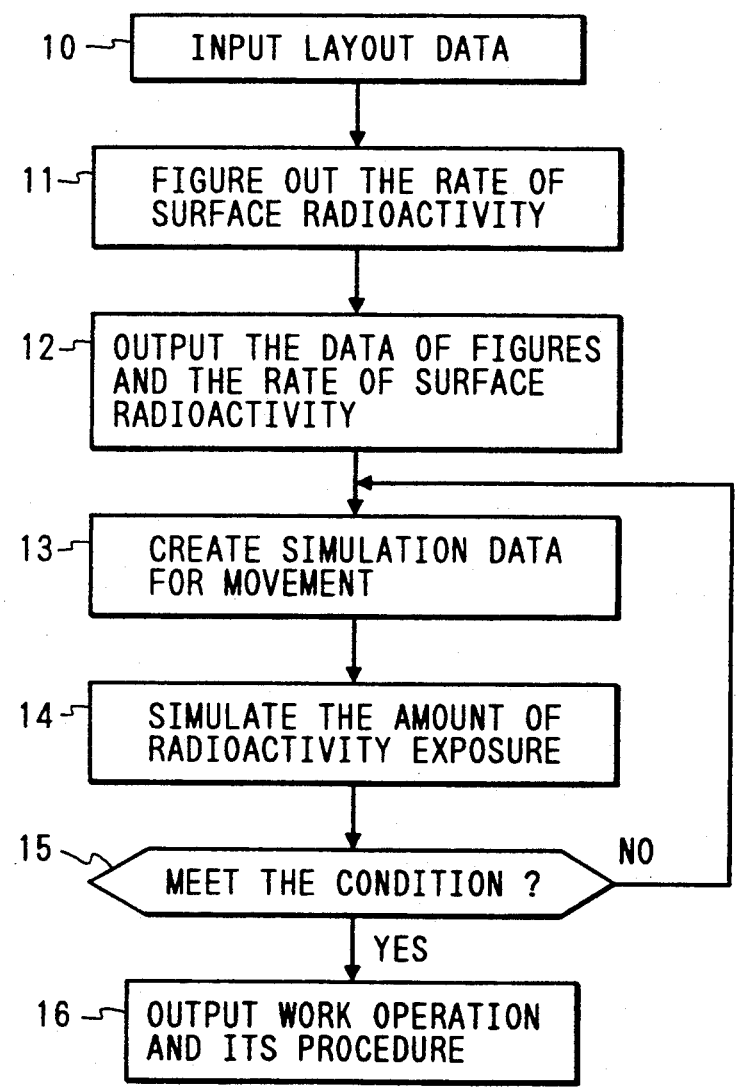
FIG. 1 is an explanation view of the processing procedures carried out in the apparatus for supporting the operation under radioactive rays in FIG. 2 as an embodiment of this invention.

The detailed study of the radioactive ray control system disclosed in the above-mentioned Japasese Patent Application, JP-A-60-120295 (1985), by the inventors has revealed that it is not possible to prepare procedures for the target operation which satisfies a determined value of the radioactivity exposure amount by the control system. That is, in the Patent Application, when the procedures of the target operation for this time is different from the procedures of the previous operation, the radioactivity exposure amount is estimated taking the prepared evaluation factors into account. In such an estimation of the radioactivity exposure amount, it is necessary to decide the evaluation factors of work operation appropriately. However, it is difficult to decide the evaluation factors of operation appropriately. Thus the expected total radioactivity exposure amount which has been estimated contains a large amount of errors and it is not easy to prepare an appropriate procedures for the target operation.

Accordingly, inventors investigated several kinds of methods for obtaining proper work operation procedures, and arrived to the present invention. Hereinbelow, embodiments of the present invention are explained.

An apparatus for supporting the operation under radioactive rays according to one embodiment of this invention will be explained. FIG. 2 shows the constitution of the apparatus for supporting the operation under radioactive rays according to this embodiment.

An operation processing arrangement 5 has an operating portion 5a, a processing procedure storing portion 5b, input portions 5c and 5e, an output portion 5d and 5g, and storing portion as an internal memory 5f. The processing procedure storing portion 5b stores the processing procedure shown in FIG. 1. An input unit (keyboard) 4 is connected with the input portion 5c. A storage unit 6 is connected with the input portion 5c and output portion 5g. The storage unit 6 stores the graphic data of a state, in which the equipments and pipings of a nuclear power plant are laid out, in a certain storing area. The storage unit 6 stores the surface radioactivity rates of the above-mentioned equipments and piping in another storing area. The layout graphic data and the data of the surface radioactivity rates may be stored in separate storage units. An image data storage unit 3 stores the information such as graphic information, etc., outputted from the output portion 5d of the operation processing arrangement 5. An image displaying control unit 2 displays the information stored in the image data storage unit 3 on displaying means (display) 1. The processing procedures in FIG. 1 stored in the processing procedure storing portion 5b of FIG. 2 are successively called into the operating portion 5a and executed.

The content of the processing in this embodiment will be explained below referring to the processing procedure of FIG. 1.

In the first place, the input of layout data (step 10) is carried out. the detailed content of the processing of step 10 is shown in FIG. 3. The operator input data of an area within the nuclear power plant, in which the operation requiring for studying the radioactivity exposure amount (target operation) is carried out, from the input unit 4. For example, the name of the nuclear power plant "X", the name of the plant housing "R" and the name of the area "R5B" are inputted. These data are entered into the operating portion 5a (step 10A). The inner part of the housing in which the nuclear power plant is disposed is an area with controlled radioactive rays. The graphic data for the area concerning to these inputted data (area with controlled radioactive rays), in which a plurality of structures (referred to in general for equipments, pipings, walls of the housing, shields from radioactive rays, heat insulators and supports, etc.) are laid out, is searched from the storage unit 6 and entered (step 10B). The structure means the constituting elements of the plant dealing with radioactive substances, the constituting elements of the housing containing the plant, and the objects provided in the housing along with the installation of the plant. These layout graphic data are generated by use of a CAD system not shown. The generation of layout graphic data is made e.g. as described in Japanese Patent Application (kokai) 62-114063 (from p.24, upper-right column, line 9 to p.30, upper-right column, line 10). In step 10A, the structures to which the target operation is applied or the name of the target work operation may be inputted, instead of the area with controlled radioactive rays in which the target work operation is carried out. In this case, in step 10B, the layout graphic data of the area with controlled radioactive rays containing the designated structures or the structures contained in carrying out the designated operation is searched. Thus anyway in step 10, the designated layout graphic data is searched.

Figure 5:
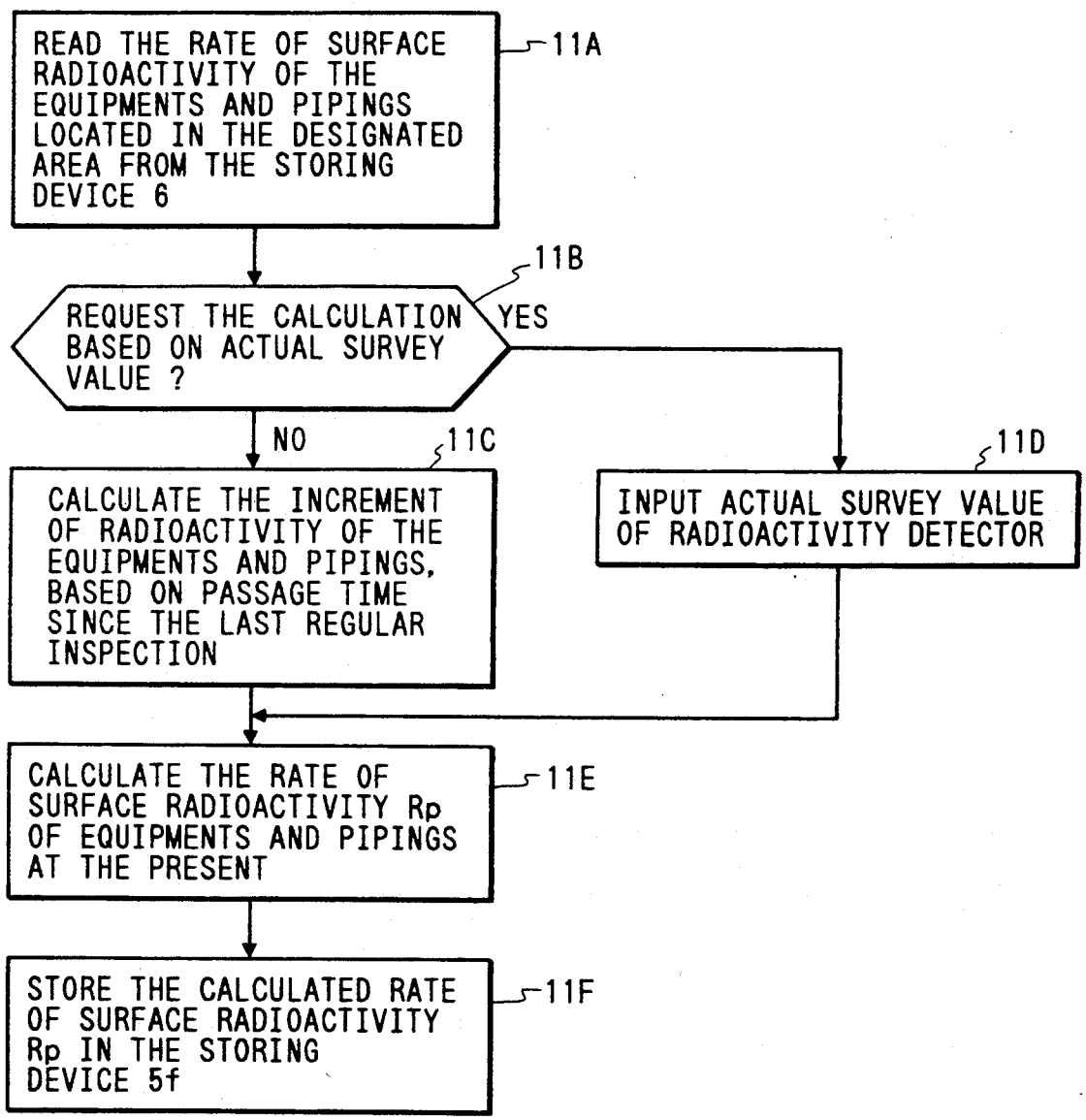
FIG. 5 is a detailed explanation view of step 11 in FIG. 1.

In step 11, the surface radioactivity rates of the structures are calculated. The detailed processing in this step is shown in FIG. 5. The surface radioactivity rates for the structures disposed in the area with controlled radioactive rays (designated area) are searched from the storage unit 6 and entered (step 11A). In step 11B, it is determined as to whether there is a request for the calculation of the surface radioactivity rates based on the measured values by a radioactive ray detector or not. This request is entered by the operator via the input unit 4 after the processing in step 11A has been completed. Of course, the guidance page is displayed for deciding as to whether the request is needed or not. If there is no such request, the processing in step 11C is initiated. If there is such a request, the processing in 11D is initiated.

In step 11C, the increased amounts of the surface radioactivity rates of the structures are calculated on the basis of the time which elapsed after the previous regular inspection of the nuclear power plant had been completed. The increased amounts of the surface radioactivity rates vs. time that elapsed can be obtained according to the empirical formula based on the statistic operation of the data in the past. The reason of taking the previous regular inspection as the basis is that the data of the surface radioactivity rates in the storage unit 6 are corrected by the measured values of radioactive rays at the time when the regular inspection has been completed. If such correction is not carried out, the surface radioactivity rates are obtained by the empirical formula based on the tendency of the data in the past on the nuclear power plant operation experience. In step 11D, the radioactivity amount measured by a radioactive ray detector disposed in the designated area is entered. In the next place, the surface radioactivity rates of the equipments and pipings at the present time are calculated (step 11E). If the processing in the step 11C has been made, the surface radioactivity rates at the present time $R_p$ are obtained by adding the increased amounts of surface radioactivity rates obtained in step 11D to the surface radioactivity rates entered in step 11A. If the processing in step 11D has been made, the surface radioactivity rates $R_p$ at the present time are obtained by use of the measured values of the radioactivity amounts. The surface radioactivity rates $R_p$ thus obtained are entered into the storage unit 5f (step 11F).

Figure 6:
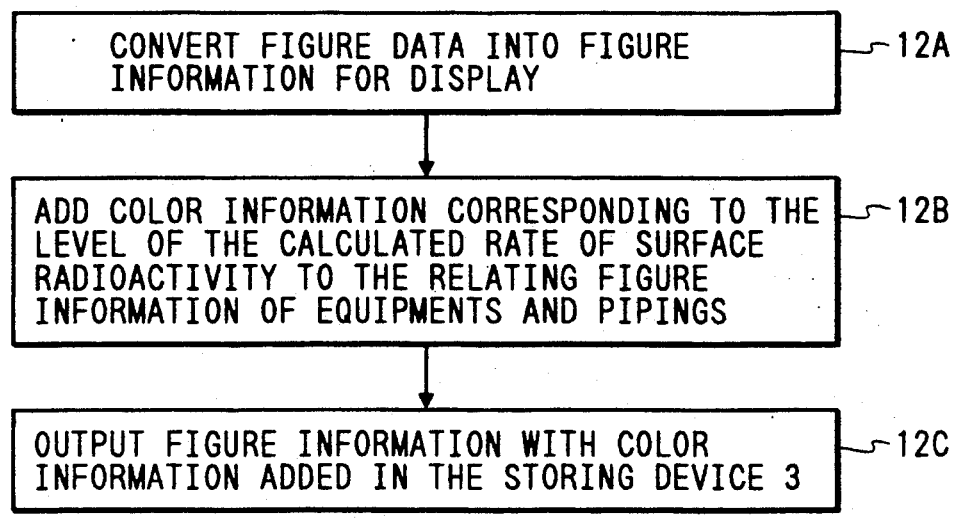
FIG. 6 is a detailed explanation view of step 12 in FIG. 1.
Figure 7:
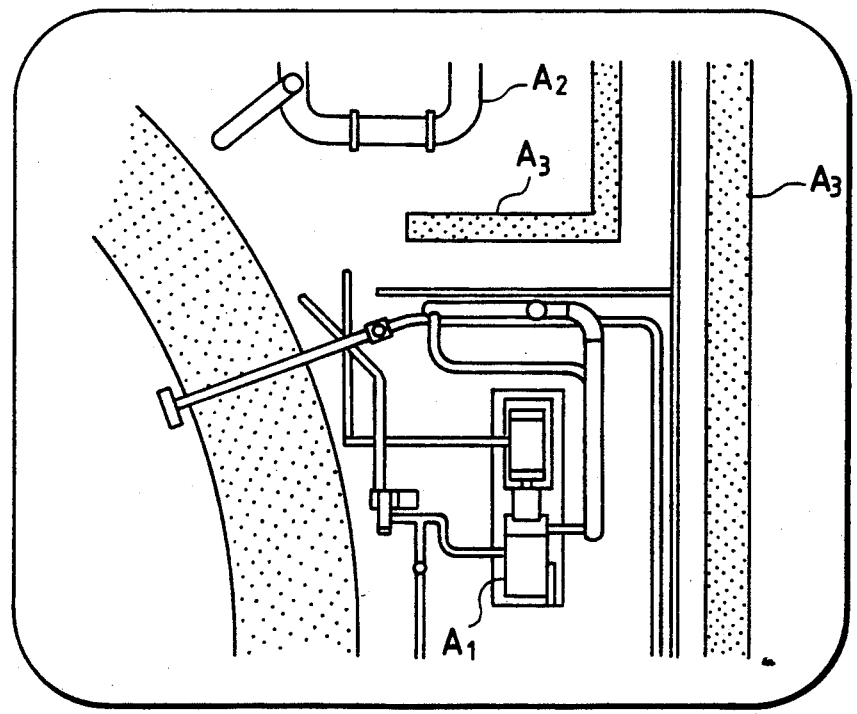
FIG. 7 is an explanation view showing an example of the data, as one displayed on a display unit, and outputted in step 12C in FIG. 6, FIG. 8 and FIG. 9 are detailed explanation view of step 13 in FIG. 1, FIG. 10 an explanation view showing an example of the entered access route.

Step 12 is executed after step 11 has been completed. FIG. 6 shows the detail of step 12. The graphic data entered in step 10B are converted into graphic information for displaying (step 12A). The color information corresponding to the levels of the surface radioactivity rates $R_p$ for the equipments or pipings obtained in step 11 is selected. The selected color information is added to the graphic information of the corresponding equipments or pipings (step 12B). The color information is predetermined depending on each level of the surface radioactivity rate. For example, green is selected for a surface radioactivity rate $R_p$ of low level, yellow for a surface radioactivity rate $R_p$ of middle level and red for a surface radioactivity rate $R_p$ of high level. The graphic information added with color information is outputted into the image data storage unit 3 (step 12C). This graphic information is outputted into the display unit 1 through the image display and control unit 2 and displayed on the display unit 1. FIG. 7 illustrates an example of the image displayed on the display unit 1. Here, the equipment $A_1$ is displayed with green lines, because the surface radioactivity rate $R_p$ is of low level. The wiring $A_2$, the surface radioactivity rate of which is of middle level, is displayed with yellow level. Besides, $A_3$ is a wall. The graphic of the paths, along which workers can go, are also displayed, although they are not depicted in the picture of FIG. 7. The operator can know the surface radioactivity rate for each portion of the actual nuclear power plant by seeing the graphics of the nuclear power plant displayed on the display unit 1 as shown in FIG. 7. Particularly, it is described in Japanese Patent Applications Kokai (Laid-Open) Nos. 59-54985 (1984) and 61-212782 (1986) that the surface to be measured is divided into small sections based on the measured value by a radiation detector and the color information corresponding to the strength of radioactive ray is alloted for each small section. However, because the layout graphic data of the structures in the housing are used in this embodiment, the radioactivity amount of each structure, which is laid out actually, can be seen.

Figure 8:
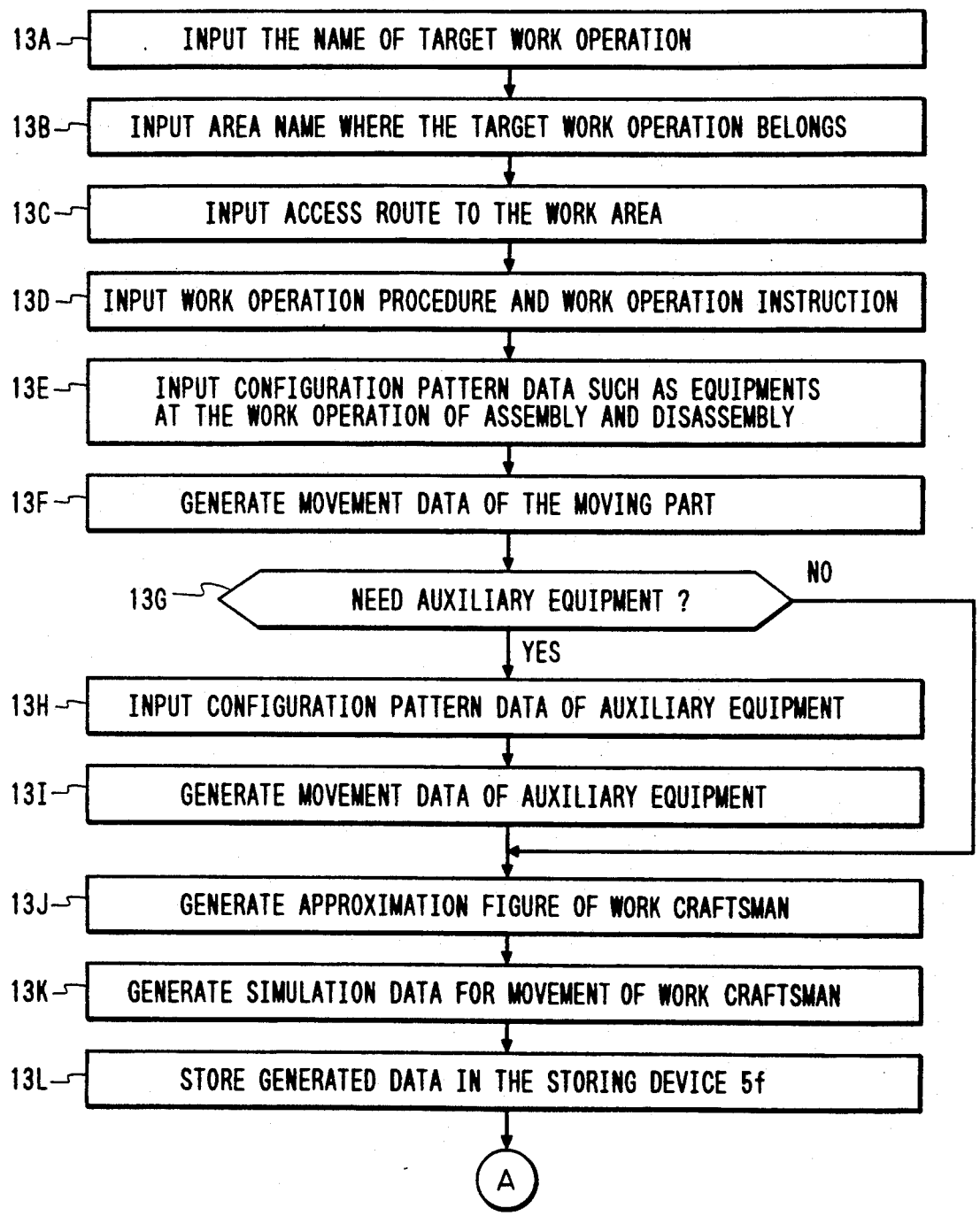
Figure 9:
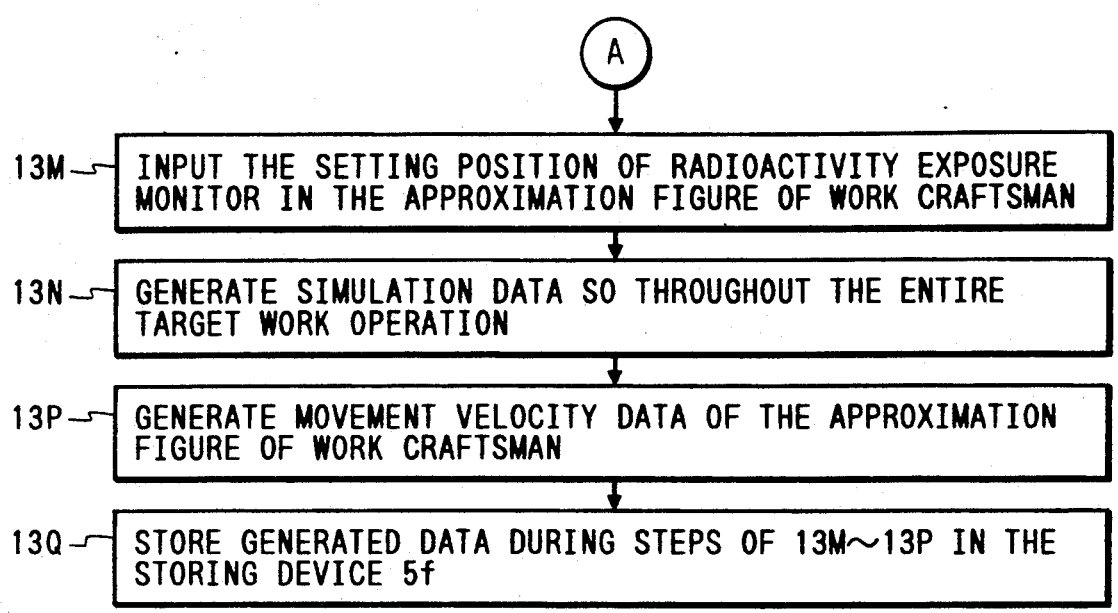
Figure 10:
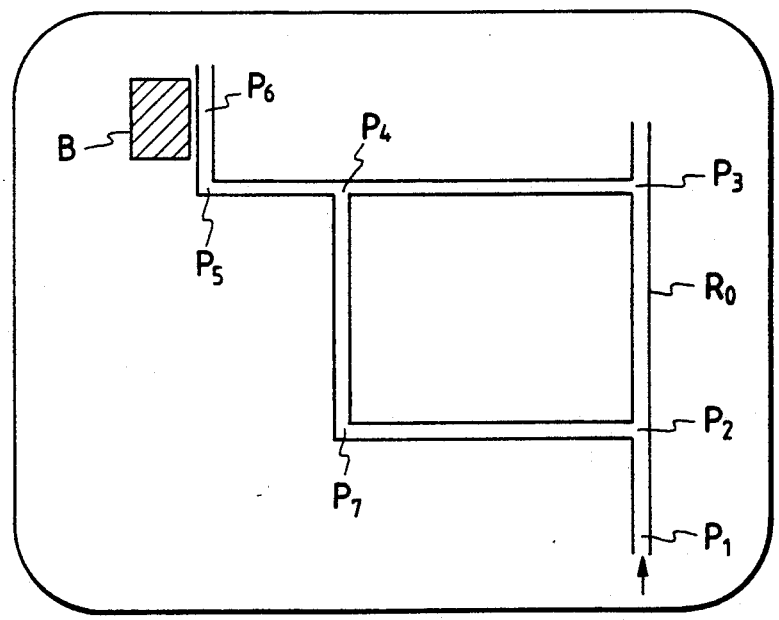
Figure 12:
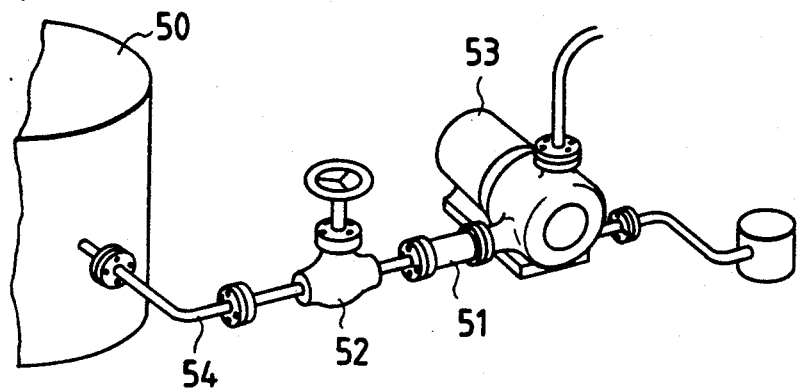
FIG. 12 is a perspective view of the system in which a target work operation is applied.

In the next place, the generation of simulation data of movement is carried out (step 13). The details of step 13 are shown in FIGS. 8 and 9. The name of the target work operation carried out in the area designated in step 10A is inputted (step 13A). For example, "Strainer exchange operation of the system so-and-so" is inputted as the name of the target operation. When the name of the target operation is inputted in step 10A, the processing in step 13A is not required. The work operation area in which the target operation is carried out is inputted (step 13B). The work operation area is a particular narrow part contained within the above-mentioned designated area. An access route (passage), along which workers move in order to reach from the entrance of the housing R to the work operation area, is inputted (step 13C). The input of this access route is made by successively displaying the graphic data containing the passage (searched from the storage unit 6), along which workers move in order to reach from the entrance of the building R to the operation area, on the display unit 1. This input of the work access route will be explained on the basis of FIG. 10. FIG. 10 shows the graphic data displayed on the display unit 1, a part of the data which are read out from the storage unit 6. In FIG. 10, $R_0$ is the path along which workers move and B is the work operation area designated in step 13B. In this, the graphics of equipment and pipings are omitted in FIG. 10. The operator inputs the access route of the workers, e.g. an access route $P_1 \rightarrow P_2 \rightarrow P_3 \rightarrow P_4 \rightarrow P_5 \rightarrow P_6$, from the input unit 1 (or with a light pen), looking at the screen on which the graphics of FIG. 10 are displayed. If there is another access route to be considered ($P_1 \rightarrow P_2 \rightarrow P_7 \rightarrow P_4 \rightarrow P_5 \rightarrow P_6$, in FIG. 10), also the access route is inputted. Because the information of the surface radioactivity rates of equipment and pipings is added to the graphic information, the operator can grasp generally an access route with a higher radioactivity exposure amount and an access route with a lower radioactivity exposure amount, looking at the screen of the display unit 1. Therefore setting (inputting) of an access route with increasing radioactivity exposure amount can be avoided. This allows the time required for simulation of the radioactivity exposure amount when there are a plurality of access routes to be reduced. In the next place, the procedures and instruction for the target work operation are inputted (step 13D). The procedures and instruction for the exchange operation of the strainer entered in step 13A are shown in FIG. 11. The target system by such a work operation is shown in FIG. 12. In FIG. 12, 50 is a tank, 51 is a strainer, 52 is a valve and 53 is a pump. the strainer 51 has flanges at both ends. These flanges are detachably secured to the flange of the pump 53 and to the flange attached to the valve 52 by means of bolts respectively. The valve 52 is connected with the piping attached to the tank 50. Although not shown in FIG. 11, the action of going to the work operation area along the above-mentioned access route in order to carry out the exchange operation of the strainer shown in FIG. 11 and the action of returning from the work operation area to the entrance of the housing after having finished the determined operation are ones included in the operation procedures, respectively. A few of representative configuration graphic data of the equipments and pipings which are a target of the work operations during detaching and attaching operation are entered (step 13E). For the strainer exchange operation, the configuration graphic data of the state in which the strainer 51 is taken away from the graphic data of FIG. 12 (which is prepared by a CAD system and stored in the storage unit 6) is inputted. In the case of disassembly of equipment, the data denoting a few of representative figuration graphics of the equipments in the midway of disassembly and after completed disassembly are inputted. When equipments for inspection (for example, a supersonic flaw detector) are to be attached to the equipments or pipings, a few of the figuration graphic data in the midway of attachment are inputted. The input of each data in steps 13A~13D is urged upon the operator by displaying the guidance on the display unit 1 requiring the data input before each step. These data are entered by use of the input unit 4. Data of displacement state of objects at the time of their detachment or attachment, which are contained in an installation (for example, a plant, a system) and are required to be detached or attached (hereinafter, referred to as target displacement portions, concretely e.g. the strainer 51) are generated (step 13F). That is, the data of displacement of the strainer 51, which moves corresponding to the proceeding of the operation, is generated. It is determined as to whether auxiliary units are necessary or not by use of the data of the procedures or instruction of the work operation (step 13G). The auxiliary units are instruments and devices used when the objects required to be detached or attached are moved. In the example of FIG. 11, the chain block and pulling cart serve as auxiliary units.

Figure 13:
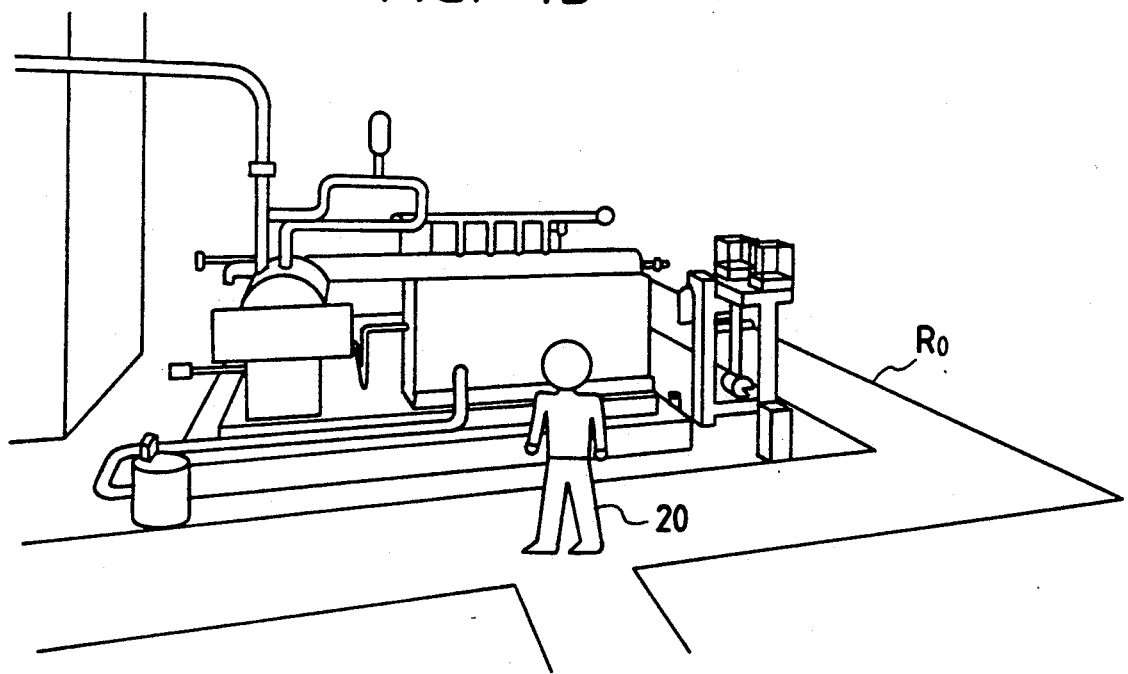
FIG. 13 is an explanation view showing an example of worker approximation graphic generated in step 13J in FIG. 8, FIG. 14 and FIG. 15 are detailed explanation views of step 14 in FIG. 1.

If the determination in step 13G is "YES", step 13H and step 13I are executed. The data of the representative figuration graphics of the auxiliary units are inputted (step 13h). The data of the representative figuration graphics of the chain block and pulling cart to be inputted by the operator through the input unit 4 are inputted. This data input is also urged by the above-mentioned displaying of the guidance requiring the data input on the display unit 1. In step 13I, the data of displacement of the auxiliary units during work operation are generated by utilizing the data inputted in step 13H (step 13I). That is, the data of displacement of the chain block and pulling cart are generated. In the next place, translation to step 13J is made. If the determination in step 13G is "NO", step 13J is executed. In step 13J, the approximation graphic of a worker is generated. The approximation graphic 20 is one as shown in FIG. 13. The approximation graphic of a worker is shown by 35 in FIG. 30 of U.S. patent application Ser. No. 929,894 (filed on Nov. 13, 1986), and as an example the coordinate such as the formula (4) on p.27, of the above U.S. patent application is given. The approximation graphics of workers are generated by the number of workers necessary for carrying out the target work operation. The number of necessary workers is determined by the operator on the basis of the procedures and instruction for the target work operation. In the next place, the movement simulation data for approximating the movement of workers are generated for respective worker approximation graphics (step 13K). When the target work operation is to be carried out by a plurality of workers, the tasks contained in the target work operation are assigned separately and the task assigned is decided for each worker. Consequently, the movement simulation data of each worker approximation graphic is generated based on the movement of the corresponding worker carrying out the assigned task. The movement simulation data for one worker approximation graphic includes the figuration data of the worker approximation graphic approximating the movement of a worker during his movement along a certain access route $R_0$ and the figuration data of the worker approximation graphic approximating the movement of a worker while he is carrying out the task assigned within the target work operation. If the procedures and instruction of the work operation in FIG. 11 are carried out, the figuration data of the worker approximation graphic while he carries out the task assigned within the target work operation is generated. The processings in steps 13F, 13I, 13J and 13K are carried out interactively between the apparatus for assisting the operation under radioactive rays according to this embodiment and the operator via the display unit 1 and input unit 4. The data generated and inputted in each of the above-mentioned steps are stored in the storage portion 5f (step 13L). The location of the radioactivity exposure monitor within the each worker approximation graphic is inputted (step 13M). This set location is designated by the operator with the input unit 4. The set location may be of a plural number for one worker approximation graphic. The existence of a plurality of locations means that the radioactivity exposure monitors are disposed at respective designated locations, e.g., at the head, breast and waist part, etc. In step 13N, the respective data obtained in steps 13F and 13K are combined and the simulation data $S_0$, which moves the respective worker approximation graphics and the graphics of target displacing portion (containing the graphics of auxiliary units, if they are used) and which includes a series of movements through the whole target work operation, are generated. The simulation data $S_0$ are generated by combining the respective data of the movement of a worker when he goes from the entrance of the housing R to the work operation area B through the path $R_0$, the movement of the worker in carrying out the task assigned within the target work operation, the movements of the target displacing portion and auxiliary units in relation to the task assigned, and the movement of the worker when he returns from the work operation area B to the entrance of the housing R, taking the procedures and instruction of the target work operation into account. The data of the velocities of displacement and movement of each worker approximation graphics at the time of simulation are generated (step 13P). These velocity data are generated by use of each velocity data for an actual worker inputted by the operator with the input unit 4. The displacing velocity data of the above-mentioned target portion to be displaced and auxiliary units are also generated by use of the velocity data at the time of above-mentioned associating simulation. In order to reduce the time for simulation, each velocity at the time of simulation is remarkably short compared with each velocity of an actual worker. For example, each velocity is decided so that the simulation may be completed in 20~30 minutes. However, it is also possible to decide each velocity so that the time for simulation may be shorter, or longer, than the above-mentioned time.

If there are a plurality of workers for target operation, in order to reduce the waiting time within the work operation area B, the start time from the entrance of the housing R (the movement start time of the worker approximation graphic) is decided in different times corresponding to the tasks assigned to the workers. This decision is made by use of the input unit 4. The data generated and inputted in steps 13M, 13N and 13P are stored in the storage portion 5f (step 13Q). The processing in step 13 is completed by the heretofore mentioned.

Figure 14:
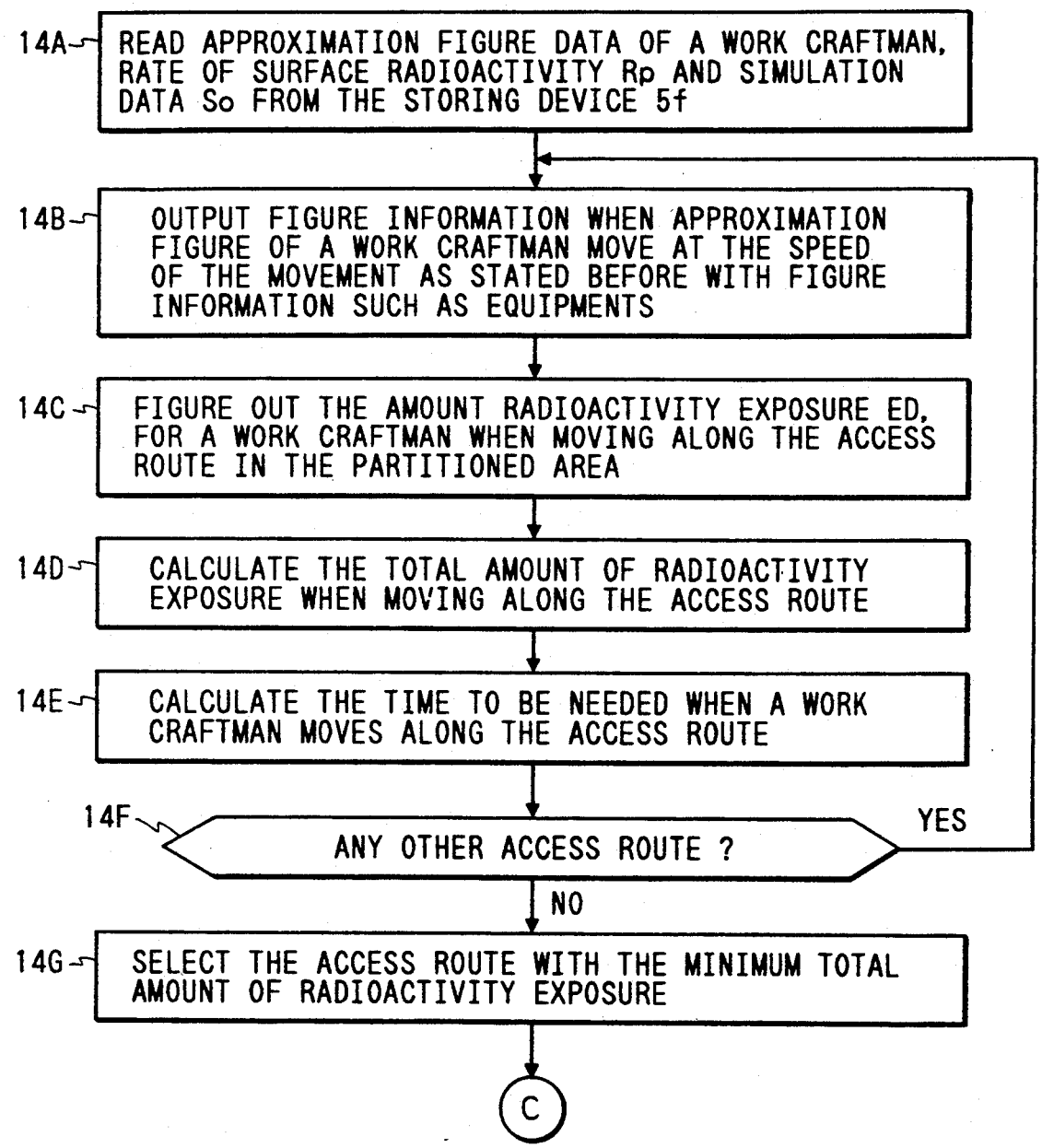
Figure 15:
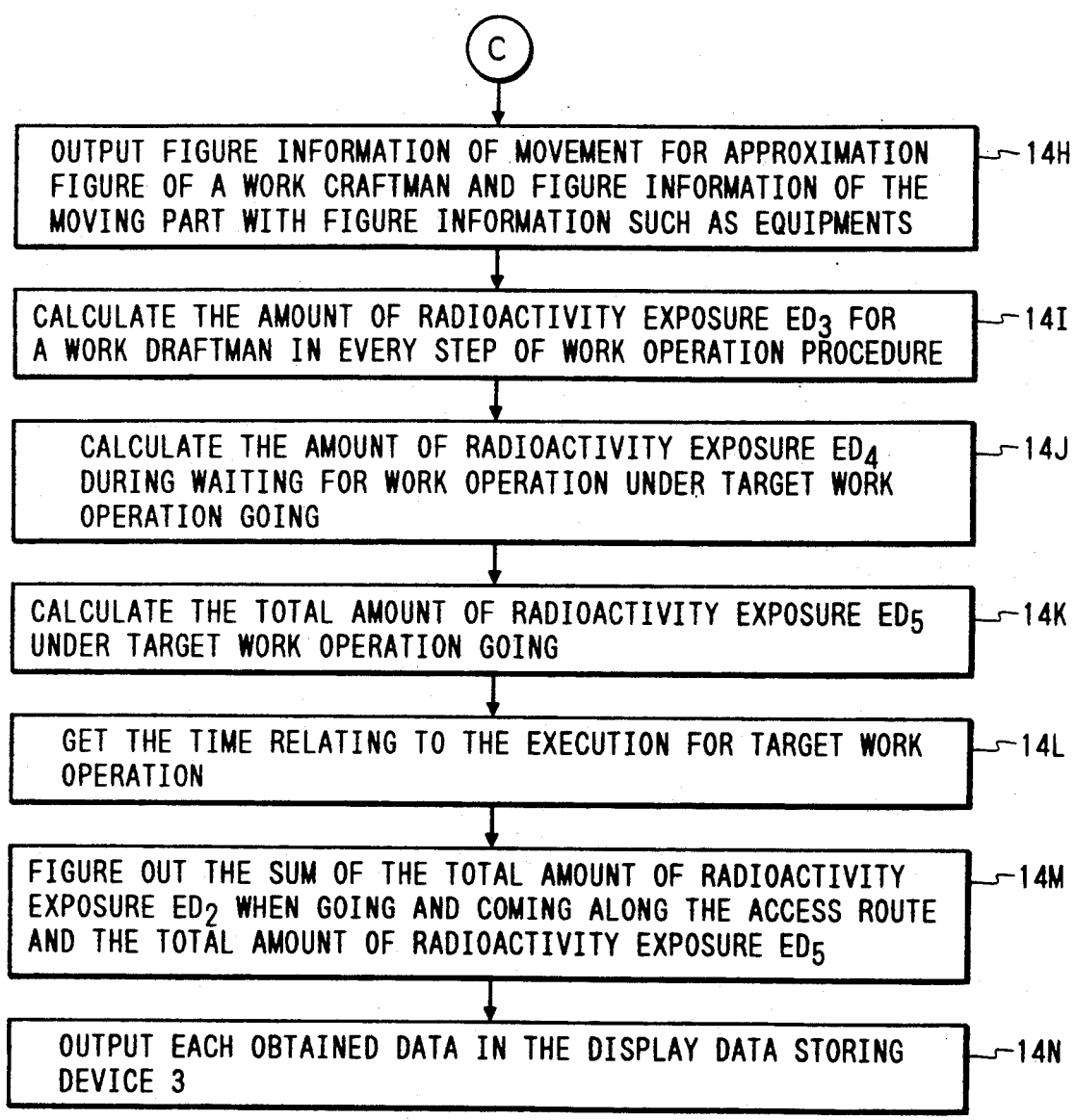

In step 14, the simulation of the radioactivity exposure amount is carried out. In step 14, the radioactivity exposure amount is calculated at the location of the radioactivity monitor inputted in step 13M. The details of step 14 are shown in FIGS. 14 and 15. In the first procedure of step 14, the data of the worker approximation graphic, the surface radioactivity rate $R_p$ and the simulation data for each worker approximation graphic $S_0$ are read from the storage portion 5f (step 14A). In step 14B, the worker approximation graphic is converted into the graphic information on the basis of the data inputted in step 14A for displaying graphics moving at the velocity generated in step 13P. This graphic information is outputted into the image data storage unit 3 along with the graphic information for equipments, pipings, walls of housings, shields from radioactive rays and paths $R_0$ generated in step 12A. Consequently, the state in which a worker approximation graphic moves along a path, a determined access route at the above-mentioned displacement velocity is displayed on the screen of the display unit 4. The worker approximation graphic, of which the start time from the entrance of the building R is different, starts movement when the time determined in step 13P has come. At the time of moving along the access route, the radioactivity exposure amount $ED_1$ of a worker is obtained for each part of the access route (step 14C). Each part of the access route means each small section obtained by subdividing the access route into sections of a determined width along its longitudinal direction. Because the moving velocity of each worker approximation graphic moving along the access route is identical, the radioactivity exposure amount $ED_1$ is obtained by use of a certain worker approximation graphic. That is, the radioactivity exposure amount $ED_1$ is one at the decided location entered in step 13M and is obtained for each small section on the basis of the surface radioactivity rate $R_p$ of equipments and pipings. This radioactivity exposure amount $ED_1$ has a relation also with the time $T_1$ required by a worker approximation graphic for moving through a small section. The longer the time $T_1$ is, the larger the radioactivity exposure amount $ED_1$ becomes, and adversely the shorter the time $T_2$ is, the smaller it becomes. The time $T_1$ is obtained according to the moving velocity of the worker approximation graphic during simulation. The time $T_2$ required by an actual worker for moving through a small section is extremely long compared with the time $T_1$. Consequently, the radioactivity exposure amount $ED_1$ is calculated as corresponding to the time $T_2$ using the equation relating the time $T_1$ and the time $T_2$. Further, if there is a wall of the housing R or a shield from radioactive rays between the location of a worker approximation graphic and the equipment or pipings giving radioactive effects on the location, the radioactivity exposure amount $ED_1$ is calculated taking the shielding effect from radioactive rays according to this into account. It is determined easily whether there is a wall or shield or not, because the data of the laid out graphics created by a CAD system are entered in step 10B. After the radioactivity exposure amount $ED_1$ have been calculated for all the small sections along an access route, the total radioactivity exposure amount $ED_2$ during the movement along the access route is calculated (step 14D). That is, the total radioactivity exposure amount $ED_2$ corresponds to the sum of the radioactivity exposure amount $ED_1$ of all the small sections. The time $T_0$ required by a worker for moving from the entrance of the housing R to arrival at the work operation area B is obtained (step 14E). The time $T_0$ is obtained by summing the time $T_2$ for all the small sections. In step 14F, it is determined whether there is another access route decided in step 13C. If this determination is "YES", one of the other access routes is selected and the processings in steps 14B~14F are repeated. When the determination in step 14F is "NO", the processing in step 14G is executed. In step 14G, the access route for which the total radioactivity exposure amount $ED_2$ is the minimum is selected.

Each worker approximation graphic is converted into graphic information for displaying the figuration in which the task assigned is performed at the movement velocity created in step 13P on the basis of the data entered in 14A (step 14H). Further, in step 14H, the graphics of target parts to be moved and auxiliary units are also converted into graphic information for displaying on the basis of data entered in step 14A. Here, those obtained graphic information is outputted along with the graphic information of equipments, etc., similarly as in step 14B. According to this, the movement of each worker, the movements of the target parts to be moved and auxiliary units are displayed as movements of each worker approximation graphic, the approximation graphics of the target parts to be moved and approximation units according to the order of the work procedures of the operation on the screen of the display unit 1. A series of movements of the respective approximation graphics according to the procedures of work operation when the target work operation is carried out is generated because the necessary data are created on the basis of the corresponding procedures and instruction of work operation in step 13N. That is, because the data are created by rearranging the movements of the respective worker approximation graphics for the tasks assigned along with the steps of the procedures of work operation (FIG. 11, No. 1~7), a series of movements in the target operation can be approximated. The steps in the procedures of work operation is called work operation procedure steps.

The radioactivity exposure amount $ED_3$ of each worker for each work operation procedure step is calculated within the task assigned of the corresponding worker (step 14I). The calculation of the radioactivity exposure amount $ED_3$ is made similarly as the calculation of the radioactivity exposure amount $ED_1$. Of course, the effects of the walls of housing and the shields for radioactivity are taken into account. However, the time $T_4$ required actually by a worker for carrying out a task related with a work operation procedure step within the task assigned is longer than the time $T_3$ required for the simulation carrying out the task. Consequently, the radioactivity exposure amount $ED_3$ is calculated as corresponding to the time $T_4$ using the equation relating the time $T_3$ and the time $T_4$. The time $T_3$ is obtained according to the movement velocity decided in step 13P. The time $T_5$ required in each work operation procedures step during simulation is also obtained according to the above-mentioned movement velocity. The time $T_1$ required actually for the work operation procedure step is obtained as a function of time $T_5$. If the task assigned for a worker includes two work operation procedure steps between which there is a work operation procedure step to be carried out by another worker, the time for which the other worker is carrying out the work operation procedure step of his own task assigned results in waiting time for the former worker until he begins to carry out the next task assigned. In step 14J, the radioactivity exposure amount $ED_4$ in such a waiting time is calculated. The waiting time for the work operation is obtained from the equation relating the time $T_3$ and the time $T_4$ using the time $T_3$ required by the other worker for carrying out the task. The total radioactivity exposure amount $ED_5$ during the carrying out of the target work operation is calculated for each worker (step 14K). The total radioactivity exposure amount $ED_5$ amounts to the sum of all the radioactivity exposure amounts $ED_3$ and $ED_4$ for a worker. In step 14L, time relating to performing a target work operation is obtained. Specifically, step 14L has two steps of processings. In the first step of processing, the time $T_s$ during which a worker remains within the work operation area B until the task assigned is completed is obtained for each worker. This time $T_s$ calculated by summing all the time $T_4$ used for performing the task assigned within the operation area B and the waiting time for work operation for each worker. In the second processing step, the time $T_M$ elapsing from the start of the target work operation to its completion is calculated. This is calculated by summing the time $T_i$ required for each work operation procedure step.

Figure 16:
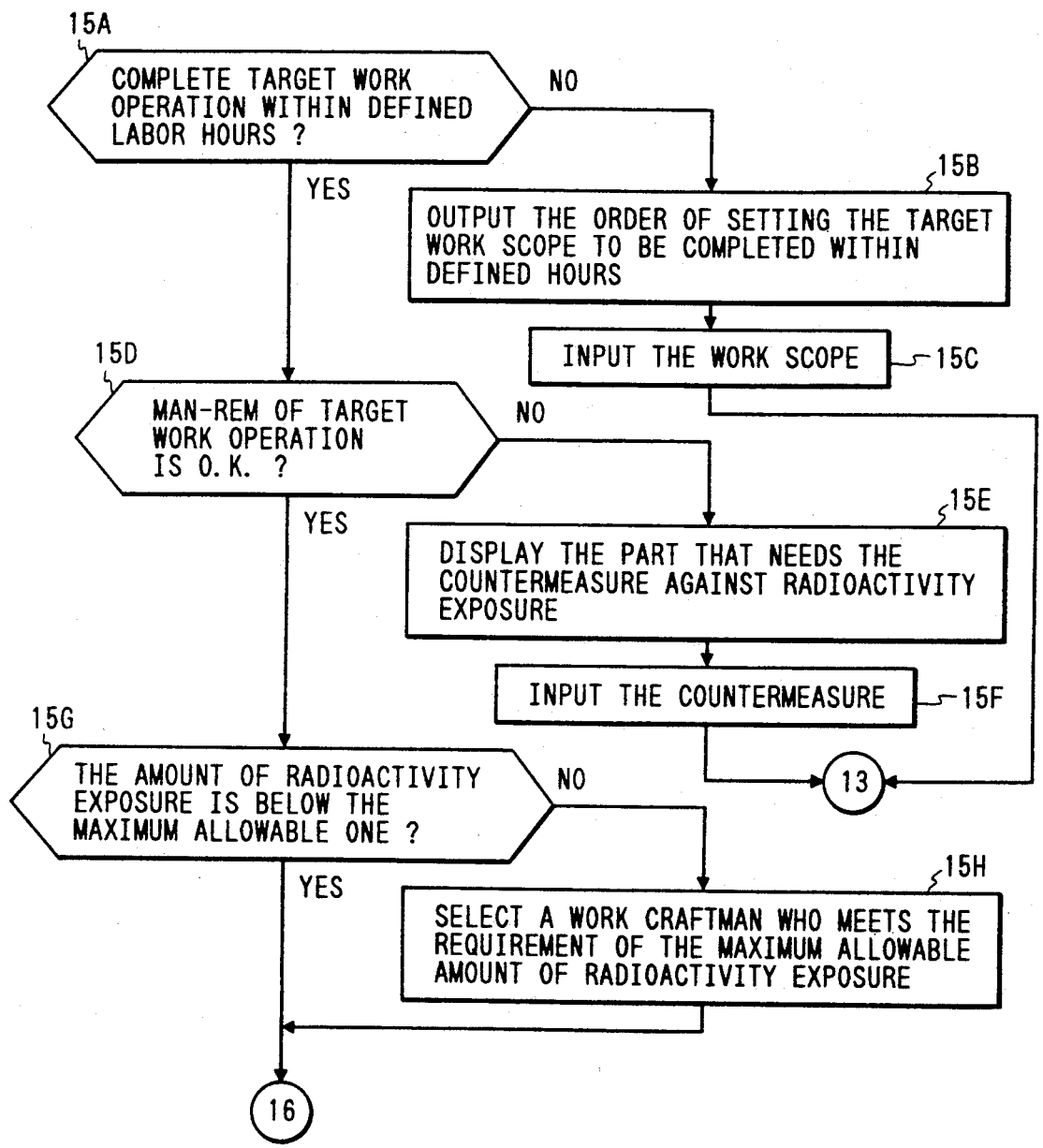
FIG. 16 is a detailed explanation view of step 15 in FIG. 1.

The sum $ED_6$ of the radioactivity exposure amount received by a worker in coming and going along the access route and the radioactivity exposure amount received by him in carrying out the target work operation is calculated for each worker (step 14M). The latter radioactivity exposure amount is the radioactivity exposure amount $ED_5$. The former radioactivity exposure amount is twice the radioactivity exposure amount $ED_2$ at the time when movement through the access route with the radioactivity exposure amount $ED_2$ being minimum. This is because the radioactivity exposure amount are equal for coming and going paths. Each processing in step 14 heretofore described corresponds, as it were, to the measurement of the radioactivity exposure amount when a worker carries out the target work operation by use of a radioactivity exposure amount monitor provided at the location designated in step 13M. That is, the radioactivity exposure amount monitor measures the radioactivity exposure amount while the worker approximation graphic with the radioactivity exposure amount monitor provided at the set location is displacing and moving in order to carry out the target work operation. The data of each radioactivity exposure amount and each time obtained in each step heretofore mentioned are stored into the storage unit 5f. Further, the data of each radioactivity exposure amount, access route with the minimum radioactivity exposure amount and each time obtained in each of heretofore mentioned steps are outputted into the image data storage unit 3 (step 14N). The information for these is displayed on the display unit 1. According to this, the operator can know the access route with the minimum radioactivity exposure amount, the radioactivity exposure amount in carrying out the target work operation and each required time. These information is extremely useful in planning the schedule of work operation under radioactive rays. That is, the planning of the schedule of work operation under radioactive rays (process charts of work operation, man-Rem stack chart and instruction of work operation procedures) becomes extremely easy. Because the movement of each worker is displayed on the display unit 1 at the same time with the simulation of the movement of each worker in the target work operation and the calculation of the radioactivity exposure amount, the operator can know a series of movements of each worker in the target work operation while the radioactivity exposure amount is calculated. Further, because the radioactivity exposure amount is obtained by simulating the actual displacement and movement of a worker within the area with controlled radioactive rays, the obtained radioactivity exposure amount is with extremely high precision. Particularly, because the radioactivity exposure amount received by a worker approximation graphic is calculated by use of the figuration data of the structures laid out in the area with controlled radioactive rays and the surface radioactivity rates of the structures, the actual distances between the worker and structures in the actual area with controlled radioactive rays and the actual relation between their locations can be reflected, so that the calculated radioactivity exposure amount are of higher precision. It is determined whether the result obtained by the processing in up to step 14 satisfies the condition or not (step 15). The detail of this step is shown in FIG. 16. In step 15, it is determined whether the target work operation will be completed within a predetermined working hours (step 15A), whether the man-Rem of the target work operation is OK' d or not (step 15D), and whether the radioactivity exposure amount of each worker is below the maximum allowable radioactivity exposure amount or not (step 15G). In this, each worker leaves the work operation area at the time when the last of his own tasks assigned within the work operation area has been completed. That is, if there is no task to be carried out in another area, each worker returns to the entrance of the housing R through the access route with the minimum radioactivity exposure amount.

In step 15A, the time required for coming and going along the access route (twice of $T_0$) and the time $T_M$ are summed in the first place. In the next place, it is determined whether the time obtained by this summation is within a predetermined working hours (e.g. eight hours a day) or not. If the determination is "NO", translation to step 15B is made. In step 15B, the guidance indicating to decide the range of the target work operation to be completed within the predetermined working hours is outputted into the image data storage unit 3. This guidance is displayed on the display unit 1. In step 15B, the required times $T_i$ and $T_0$ for each work operation procedure step are outputted along with this guidance. These times are displayed on the display unit 4. The operator enters the range of the target work operation through the input unit 4, seeing the guidance. This range of the target work operation is entered into the operating portion 5a (step 15C). The operator can easily decide the range of the target work operation to be completed within the predetermined hours, as the times $T_1$ and $T_0$ are displayed on the display unit 1. That is, after determining the time obtained by subtracting the time required for coming and going the access route from the predetermined working hours it becomes extremely easy to select the work operation procedure steps allowed to be carried out in a day on the basis of the time Ti required for work operation procedure step. Further, because the operator can know the time required for coming and going along the access route and the time $T_i$ required for each work operation procedure step, it is possible to calculate approximately how many days are required for carrying out the target work operation. Consequently, the range of work operation can be divided for each day so that the work operation is completed within the approximated days. These ranges of the target work operation are inputted in step 15C. Thereafter, the processings in steps 13~14 and 15A, which are applied to the decided rang of target work operation, are repeated.

If the determination in step 15A is "YES", translation to step 15D is made. In step 15D, the value of man-Rem is calculated which can be obtained by further summing the radioactivity exposure amount $ED_6$ of respective workers calculated in step 14M. The man-Rem means the summed value of the radioactivity exposure amount (referred to as total received radiactivity) which all the (a plurality of) workers receives while they are in the area with controlled radioactive rays (e.g. the housing of a nuclear power plant). As mentioned above, because the precision of the radioactivity exposure amount calculated in step 14 is high, the total radioactivity exposure amount obtained for the target work operation is also with high precision. The total radioactivity exposure amount includes also the radioactivity exposure amount during the movement along the access route. When the value of the calculated total radioactivity exposure amount satisfies a predetermined condition, translation to step 15G is made. When the value does not satisfy the predetermined condition, translation to step 15E is made. There are two ways, as follows, for determining whether the calculated value of the total radioactivity exposure amount (man-Rem) is OK' d or not. In this embodiment, either of the ways may be employed. That is, in the first way, a predetermined value of man-Rem and the calculated value of man-Rem are compared, and it determined as OK' d when the latter value is below the former value. In the second way, the value of man-Rem is not determined, the calculated value of man-Rem is displayed on the display unit 1 and it is determined that the apparatus according to this embodiment is OK' d, that is, the calculated value of man-Rem satisfies a predetermined value, in response to the signal of "OK' d" inputted by the operator with the input unit 4. In step 15E, the factor increasing the calculated value of man-Rem, that is, the information of the locations, for which radioactivity prevention countermeasures should be taken, is created and the information is outputted into the image data storage unit 3. The information is displayed on the display unit 1 along with the information outputted in step 12C. The information created in step 15E is created by combining the radioactivity exposure amounts up to the predetermined order (for example, from the radioactivity exposure amount with the maximum value to one with the third value) out of the radioactivity exposure amounts for respective work operation procedure steps (including also the procedure in which a worker moves along the access route when he goes to the work operation area and when he returns from the work operation area) with the corresponding work operation procedure. These radioactivity exposure amount have been obtained in step 14D and step 14I. The operator can know the operation procedure increasing the total radioactivity exposure amount (man-Rem) due to carrying-out of the target work operation by looking at the screen of the display unit 1 on which the information created in step 14S is displayed. In this, when the radioactivity exposure amount are obtained in step 14I not only for respective work operation procedures but also for respective small sections into which the area in which a worker moves for carrying out the work operation procedures is divided as in step 14C, the information including the radioactivity exposure amount in the predetermined number of small sections and the corresponding small sections is created in step 15E. It is a matter of course that the information for the radioactivity exposure amount in the small sections of the access route calculated in step 14C is also created. If the information employing the radioactivity exposure amount in the small sections is to be created in step 15E, it may be created as follows. That is, the color information corresponding to the levels of the calculated radioactivity exposure amount is added to the above-mentioned small sections of the graphic information obtained in step 12A. The levels are provided, for example, in ten grades, and individual colors are assigned for each level. Such color information of radioactivity exposure amount is added to the graphic information obtained in step 12A and displayed along with this on the display unit 1. Also the color information obtained in step 12B is displayed on the display unit 1. According to this, the operator can easily know the small sections, as man-Rem is increased and also can recognize easily the radioactive ray sources with high radioactivity rates (structures) affecting thereon. Consequently, the operator can easily find countermeasures to decrease man-Rem. It is also possible to display the information of the above-mentioned radioactivity exposure amount of the work operation procedures along with the information in steps 12A, 12B. It is also allowed to display the information on radioactivity exposure amounts of all the work operation procedures or of all the small sections.

The operator devises countermeasures for decreasing man-Rem seeing the information created in step 15E. Then the operator enters the countermeasures through the input unit 4. The countermeasures are entered into the operating portion 5e (step 15F). Thereafter, the processings after step 13 reflecting the countermeasures are repeated. Countermeasures and processing based on the countermeasures will be explained below. For example, supposing that each work operation procedure in Nos. 2~7 of FIG. 11 is inputted as the exchange operation of the strainer in step 13D, in the first place. Each processing in steps 13E~13Q, 14A~14N, 15A and 15D is executed. In step 15D, it is determined as "NO". In step 15E, the radioactivity exposure amount of a worker in the procedures of Nos. 3~6 becomes higher, because the tank 50 is filled with liquid generating high radioactivity. Because the displaying on the display unit 1 is made by use of a color indicating that the tank 50 is with a high level of surface radioactivity rate, the operator recognizes that the tank 50 affects the radioactivity exposure amount in the procedures of Nos. 3~6. For this, the operator conceives carrying out the work operation procedures of No. 1 in FIG. 11 before the work operation procedures of No. 2 as countermeasures, and the countermeasures are entered in step 15F. The radioactivity exposure amount is simulated in the state reflecting the countermeasures. Because the radioactive liquid within the tank 50 is discharged by the work operation procedure of No. 1, the radioactivity exposure amount in the work operation procedure of Nos. 3~6 is decreased below the value obtained at the previous time. Supposing even in this case that displaying is made again that the radioactivity exposure amount in the work operation procedures Nos. 2~7 is high. The operator conceives provision of a portable shield from radioactive rays temporarily located at the side facing to the strainer 51 of the tank 50 as countermeasures against the remaining radioactive liquid in the tank 50, seeing the graphics in FIG. 12 displayed on the display unit 1. For this purpose, the operator enters a work operation procedures of provision of a portable shield from radioactive rays at the side facing to the strainer 51 of the tank 50 between the procedures of No. 2 and No. 3 in FIG. 11 through the input unit 4. The operating unit 5a repeats each of the above-mentioned processings for the further countermeasures. When the determination in step 15D has become "YES" due to the execution of these processings, translation to step 15G is made. In this, when the determination of "YES" is made in step 15D, all the operation procedures of the target work operation in which the determination could be obtained are stored into a predetermined area of the storage unit 6. This stored information is searched and entered in step 13D when the work operation of the countermeasures has been entered in step 13A at the time of the next inspection.

In step 15G, it is determined whether the radioactivity exposure amount of each worker received during carrying out of the target work operation is below the maximum allowable radioactivity exposure amount or not. The maximum allowable radioactivity exposure amount are decided for a day, a week, three months and a year. If the condition is not satisfied for any of the maximum allowable radioactivity exposure amount, the determination in step 15G becomes "NO". A new worker, for whom the condition for the maximum allowable radioactivity exposure amount is satisfied even when the radioactivity exposure amount of another worker determined as "NO" in step 15G is added, is selected (step 15H). The radioactivity exposure amount of each worker is stored in storage unit 6.

If the determination in step 15G is "YES", step 16 is executed. In step 16, all the work operation procedures of the target work operation which satisfy the predetermined values of man-Rem in step 15D are outputted into the image data storage unit 3. These operation procedures are displayed on the display unit 1. Further, these operation procedures are printed by the printer 7 according to the request from the operator. The printer 7 is also a kind of display means. Also other information obtained by the operating portion 5a can be outputted through the printer 7 according to the request from the operator. Further, in step 16, the task assigned carried out by each worker can be outputted when the predetermined value of man-Rem has satisfied in the target work operation. Also this is displayed on the display unit 1.

According to this embodiment as mentioned heretofore, it is easy to create operation procedures in which the radioactivity exposure amount (particularly the total radioactivity exposure amount) satisfies the predetermined value in carrying out the target work operation. In particular, because the precision of the value of the calculated radioactivity exposure amount is high, appropriate operation procedures satisfying the predetermined value of the radioactivity exposure amount can be created. It is remarkably useful in planning for the number of workers for every kind of job required for carrying out the target work operation that a series of appropriate work operation procedures satisfying the value of the predetermined radioactivity exposure amount can be created for the target work operation. In this, if there are a plurality of target work operations carried out in the area with controlled radioactive rays, at least the processings in steps 13~16 are executed for each target work operation.

Figure 17:
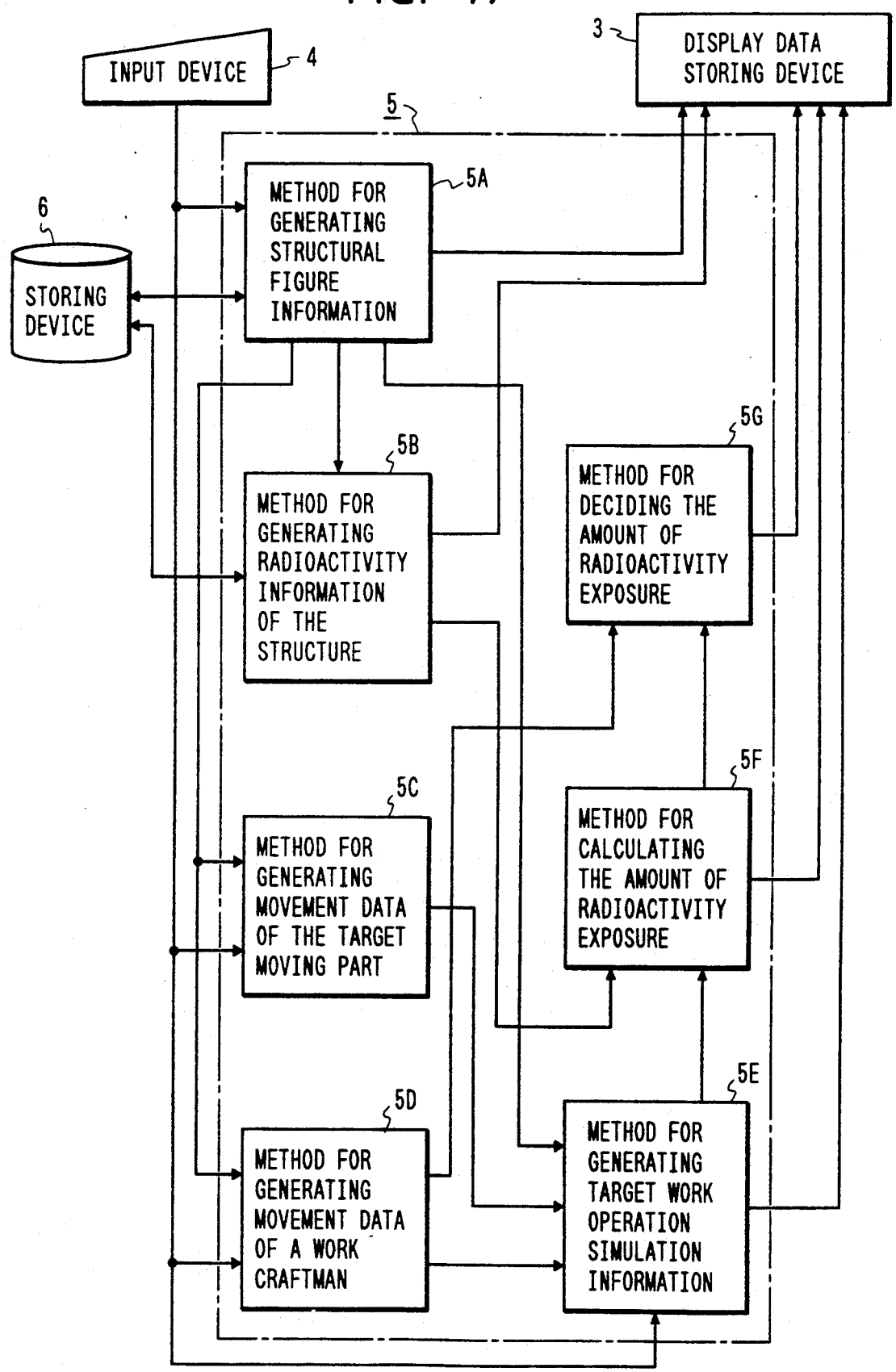
FIG. 17 is an explanation view showing functionally the operation processing unit 5 in FIG. 2 executing the processing procedures in FIG. 1.

FIG. 17 represents functionally the operation processing unit 5 executing the processing procedure in FIG. 1. It can be said that the operation processing unit 5 has means for generating structure body graphic information 5A, means for generating radioactivity information of structure body 5B, means for generating displacement data of target moving part 5C, means for generating work craftman movement data 5D, means for generating target work operation simulation information 5E, means for calculating radioactivity exposure amount 5F and means for deciding radioactivity exposure amount 5G. The means for generating structure body graphic information 5A executes the processings in steps 10A, 10B and 12A and generates the graphic information for displaying each structure disposed in the area with controlled radioactive rays designated by the input unit 4. This graphic information is outputted into the image data storage unit 3. The means for generating radioactivity information of structure body 5B, into which the layout graphic data entered by the means for generating structure graphic information in step 10 is inputted, and generates the radioactive ray information related to the structures contained in this layout graphic data. This creation of information is executed in steps 11A~11E, 12B and 12C. The means for generating displacement data of target moving part 5C executes the processings in steps 13A, 13B, 13D~13I. The displacement data generation means 5C generates the displacement data of the target moving part corresponding to the target work operation and, when required, of the auxiliary units through the processings in steps 13F and 13I, as mentioned above, on the basis of the layout graphic data outputted from the structure body graphic information generation means 5A and each work operation procedures for the target work operation. The workcraftman movement data generation means 15D executes the processings in steps 13A~13D, 13J and 13K. The target work operation simulation information generation means 5E executes the processings in steps 13M, 13N, 13P, 14B and 14H. That is, the target work operation simulation information generation means 5E, into which the graphic information obtained in structure body graphic information generation means 5A, the data obtained in the data generation means 5D and 5E, and the location of the radioactivity exposure amount monitor and each velocity data inputted from the input unit 4 are inputted, generates the graphic information indicating a series of movements of a worker within the area where the structures for carrying out the target work operation are laid out and the graphic information indicating the displacement of the target moving part, etc. Such information is outputted into the image data storage unit 3 along with the graphic information generated by the generation means 5A. The radioactivity exposure amount calculating means 5F executes processings steps 14B~14G and 14I~14N. The radioactivity exposure amount calculating means 5F calculates the radioactivity exposure amount at the location of the designated radioactivity exposure amount monitor, on the basis of the radioactive ray information of each structure in the designated area with controlled radioactive rays obtained by the radioactivity information generation means 5B and the graphic information obtained by the target work operation simulation information generation means 5E. Each of the calculated radioactivity exposure amount is outputted into the image data storage unit 3 and the radioactivity exposure amount deciding means 5G. The radioactivity exposure amount deciding means executes the processing in steps 15A~15F and 16. When the determination in step 15D is "YES", all the work operation procedures related to the target work operation used in data generation of the work craftman movement data generation means 5D by the processing in step 16 are outputted into the image data display unit 3. The data and information entered into the image data display unit 3 is displayed on the display unit 1, as explained for the processing procedures in FIG. 1.

FIG. 18 illustrates another embodiment of the processing procedures in step 11 shown in FIG. 5 in detail. In the processing procedures in this embodiment, step 11F is removed from the processing procedures shown in FIG. 5 and step 11G and 11H are added anew following to step 11E. Only these different parts will be explained. In step 11G, the surface radioactivity rate $R_s$ is calculated for each small partitioned section obtained by subdividing the designated area, using the obtained surface radioactivity rate $R_p$ of the structures (equipments, etc.). In the next place, each of the obtained radioactivity rates $R_s$ is stored in the storing portion 5f (step 11H). When such a processing procedure as shown in FIG. 18 is used as step 11 shown in FIG. 1 instead of the processing procedure shown in FIG. 5, the surface radioactivity rates $R_p$ used in step 12 and thereafter are substituted by the radioactivity rates $R_s$. Also when the processing procedure in FIG. 18 is used instead of step 11, similar effects as in the above-mentioned embodiment can be obtained.

According to the first characteristic of this invention, appropriate operation procedures satisfying the predetermined radioactivity exposure amount can be obtained easily for the target work operation.

According to the second characteristic of this invention, the operator can know easily the operation procedure or area for which receiving of radioactivity exposure should be restrained, when the predetermined radioactivity exposure amount is not satisfied. According to this, countermeasures for restraining the radioactivity exposure can be conceived simply.

According to the third characteristic of this invention, the radioactive ray of each structure located in the area with controlled radioactive rays in which the target work operation is carried out can be known easily. In particular, because radioactivity amount information is displayed along with the actual wiring situation of each structure based on the layout graphic data, the radioactivity amount distribution in the actual located situation of the structures can be known.

According to the fourth characteristic of this invention, the movement of the worker carrying out each work operation procedure of the target work operation can be recognized, while the radioactivity exposure amount of the worker in the target work operation is calculated.

It is claimed:

1. A method for supporting the operation under radioactive rays characterized by comprising steps of:
   calculating the radioactivity exposure amount received by workers due to carrying out a target operation, which is carried out in the area with controlled radioactive rays where an equipment dealing with radioactive substances is disposed and includes a plurality of operation procedures of the target operation, by means of operation processing means, utilizing layout graphic data relating to said area with controlled radioactive rays and radioactive ray data of the structures contained in said layout graphic data, and
   outputting the operation procedures of said target operation included for the calculation of said radioactivity exposure amount from said operation processing means when the calculated radioactivity exposure amount satisfies a predetermined value.

2. A method for supporting the operation under radioactive rays characterized by comprising the steps of:
   simulating the movements of workers in carrying out a target operation, which is carried out in the area with controlled radioactive rays where an equipment dealing with radioactive rays is disposed and includes a plurality of operation procedures of the target operation, by means of operation processing means, utilizing layout graphic data relating to said area with controlled radioactive rays, calculating the radioactivity exposure amount received by said workers corresponding to said simulated movements of the workers by said operation processing means, and outputting the operating procedures of said target operation included for the calculation of said radioactivity exposure amount from said operation processing means when the calculated radioactivity exposure amount satisfies a predetermined value.

3. A method for supporting the operation under radioactive rays according to claim 1, characterized by outputting the radioactivity exposure amount for each operation procedure contained in said target operation from said operation processing means when said obtained radioactivity exposure amount does not satisfy the predetermined value.

4. A method for supporting the operation under radioactive rays according to claim 1, characterized by providing the information relating to the radioactivity exposure amount for each partitioned area which is divided out of the area in which the workers move in said area with controlled radioactive rays in carrying out said target operation when said obtained radioactivity exposure amount does not satisfy the predetermined value.

5. A method for supporting the operation under radioactive rays according to claim 1, characterized by further comprising steps of:

generating a first information for displaying each structure in said area with controlled radioactive rays as a graphic using said layout graphic data, adding a second information for displaying the surface radioactivity rate of said each structure to said first information, and displaying said first information to which said second information has been added on a display unit.

6. A method for supporting the operation under radioactive rays according to claim 2, characterized by outputting the radioactivity exposure amount for each operation procedure contained in said target operation from said operation processing means when said obtained radioactivity exposure amount does not satisfy the predetermined value.

7. A method for supporting the operation under radioactive rays according to claim 2, characterized by providing the information relating to the radioactivity exposure amount for each partitioned area which is divided out of the area in which the workers move in said area with controlled radioactive rays in carrying out said target operation when said obtained radioactivity exposure amount does not satisfy the predetermined value.

8. A method for supporting the operation under radioactive rays according to claim 2, characterized by further comprising steps of:

generating a first information for displaying each structure in said area with controlled radioactive rays as a graphic using said layout graphic data, adding a second information for displaying the surface radioactivity rate of said each structure to said first information, and displaying said first information to which said second information has been added on a display unit.

9. A method for supporting the operation under radioactive rays according to claim 1, characterized by selecting an access route with the minimum radioactivity exposure amount among the access routes along which the workers move up to a work operation area where said target operation is carried out.

10. A method for supporting the operation under radioactive rays according to claim 2, characterized by selecting an access route with the minimum radioactivity exposure amount among the access routes along which the workers move up to a work operation area where said target operation is carried out.

11. A method for supporting the operation under radioactive rays characterized by comprising steps of:

selecting a layout graphic data designated by an input means from a storage means storing layout graphic data showing layout states of a plurality of structures in a housing where an equipment dealing with radioactive substances is disposed utilizing an operation processing means, calculating the radioactivity exposure amount received by workers due to carrying out a target operation, which is designated by said input means and includes a plurality of operation procedures of the target operation by means of said operation processing means, utilizing the radioactive ray data relating to said structures contained in said selected layout graphic data, and outputting when the calculated radioactivity exposure amount satisfies a predetermined value or radioactivity exposure amount, the operation procedures of said target operation under which such condition is obtained from said operation processing means.

12. A method for supporting the operation under radioactive rays according to claim 11, wherein said radioactive ray data are read out from the storage means.

13. A method for supporting the operation under radioactive rays characterized by comprising steps of:

selecting the layout graphic data designated by an input means from a storage means storing layout graphic data showing layout states of a plurality of structures in a housing where an equipment dealing with radioactive substances is disposed utilizing an operation processing means, simulating the movements of workers in carrying out a target operation, which is designated by said input means and includes a plurality of operation procedures of the target operation, by means of said operation processing means, utilizing said selected layout graphic data, calculating the radioactivity exposure amount received by the workers due to carrying out the target operation corresponding to the simulated movements of the workers by means of said operation processing means, and outputting when the calculated radioactivity exposure amount satisfies a predetermined value of radioactivity exposure amount, the operation procedures of said target operation under which such condition is obtained.

14. A method for supporting the operation under radioactive rays according to claim 11, characterized by outputting the radioactivity exposure amount for each operation procedure contained in said target operation from said operation processing means when said obtained radioactivity exposure amount does not satisfy the predetermined value.

15. A method for supporting the operation under radioactive rays according to claim 13, characterized by outputting the radioactivity exposure amount for each operation procedure contained in said target operation from said operation processing means when said obtained radioactivity exposure amount does not satisfy the predetermined value.

16. A method for supporting the operation under radioactive rays characterized by comprising steps of:
generating a first information for displaying structures in an area with controlled radioactive rays within a housing where an equipment dealing with radioactive substances is disposed as a graphic based on the layout graphic data showing the layout states of the structures in said area with controlled radioactive rays,
generating a plurality of condition approximation graphic data of worker approximators which approximate the movement of workers carrying out a target operation in said area with controlled radioactive rays,
generating a second information for displaying the approximators of said workers carrying out target operation as a graphic based on said condition approximation graphic data,
displaying the graphic of said structures and the graphic of said worker approximators for carrying out said target operation on a displaying means on the basis of said first and second information, and
calculating the radioactivity exposure amount corresponding to the movements of the graphic of said worker approximators.

17. An apparatus for supporting the operation under radioactive rays, characterized by being provided with:
an input unit,
a first storing area storing a layout graphic data in a state in which a plurality of structures are disposed in an area with controlled radioactive rays,
a second storing area storing processing procedures for executing the steps of;
selecting layout graphic data relating to said area with controlled radioactive rays designated by the output of said input unit from said first storing area,
calculating the radioactivity exposure amount received by workers due to carrying out a target operation which is outputted from said input unit and includes a plurality of operation procedures of said target operation utilizing the selected layout graphic data and said radioactive rays data being inputted which is the radioactive ray data for the structures contained in said selected layout graphic data, and
outputting the operation procedures of said target operation which is included for the calculation of the radioactivity exposure amount when said calculated radioactivity exposure amount satisfies a predetermined value
a processing means outputting said operation procedures of said target operation which is included for the calculation of said radioactivity exposure amount on the basis of said processing procedures, and
a displaying means displaying said operation procedures outputted from said processing means.

18. An apparatus for supporting the operation under radioactive rays, characterized by being provided with:
an input unit,
a first storing area storing layout graphic data in a state in which a plurality of structures are disposed in an area with controlled radioactive rays,
a second storing area storing processing procedures for executing steps of;
selecting a layout graphic data relating to said area with controlled radioactive rays designated by the output of said input unit,
simulating the movements of workers in carrying out a target operation including a plurality of entered operation procedures of said target operations inputted which is outputted from said input unit utilizing said selected layout graphic data,
calculating the radioactivity exposure amount received by said workers corresponding to the simulated movements of said workers, and
outputting the operation procedures of said target operation which is included for the calculation of said radioactivity exposure amount when said calculated radioactivity exposure amount satisfies a predetermined value,
a processing means outputting said operation procedures of said target operation which is included for the calculation of said radioactivity exposure amount on the basis of said processing procedures, and
a displaying means displaying said operation procedures and said radioactivity exposure amount of said operation procedures outputted from said processing means.

19. An apparatus for supporting the operation under radioactive rays according to claim 17, wherein said second storing area stores said processing procedures including a step of outputting the radioactivity exposure amount for each of said operation procedures included in said target operation which is included for the calculation of radioactivity exposure amount when said calculated radioactivity exposure amount does not satisfy the predetermined value, and further being provided with;
said processing means outputting said operation procedures of said target operation which is included for the calculation of said radioactivity exposure amount and said radioactivity exposure amount for each said operation procedures individually on the basis of said processing procedures, and
said displaying means displaying said operation procedures and said radioactivity exposure amount of said operation procedures outputted from said processing means.

20. An apparatus for supporting the operation under radioactive rays according to claim 17, wherein said second storing area stores said processing procedures including steps of;
generating a first information for displaying each structures in said area with controlled radioactive rays as a graphic on the basis of said selected layout graphic data, and
adding a second information relating to the radioactivity exposure amount for each partitioned area which is divided out of the area in which workers move for carrying out said target operation which is included for the calculation of said radioactivity exposure amount to said first information when said calculated radioactivity exposure amount does not satisfy the predetermined value,
and said apparatus further being provided with;

said processing means outputting said operation procedures of said target operation which is included for the calculation of said radioactivity exposure amount and said first information with said second information being added on the basis of said processing procedures, and said displaying means displaying said operation procedures and said first information with said second information being added which have been outputted from said processing means.

21. An apparatus for supporting the operation under radioactive rays according to claim 17, wherein said second storing area stores said processing procedures including steps of;

generating the first information for displaying each structure in said area with controlled radioactive rays as a graphic using said layout graphic data, and adding a second information for displaying the surface radioactivity rate of each said structure to said first information, and said apparatus further being provided with;

said processing means outputting said operation procedures of said target operation which is included for the calculation of said radioactivity exposure amount and said first information with said second information being added on the basis of said processing procedures, and said displaying means displaying said operation procedures and said first information with said second information being added which have been outputted from said second processing means.

22. An apparatus for supporting the operation under radioactive rays according to claim 18, wherein said second storing area stores said processing procedures including a step of outputting the radioactivity exposure amount for each of said operation procedures included in said target operation which is included for the calculation of radioactivity exposure amount when said calculated radioactivity exposure amount does not satisfy the predetermined value, and further being provided with;

said processing means outputting said operation procedures of said target operation which is included for the calculation of said radioactivity exposure amount and said radioactivity exposure amount for each said operation procedures individually on the basis of said processing procedures, and said displaying means displaying said operation procedures and said radioactivity exposure amount of said operation procedures outputted from said processing means.

23. An apparatus for supporting the operation under radioactive rays according to claim 18, wherein said second storing area stores said processing procedures including steps of;

generating a first information for displaying each structures in said area with controlled radioactive rays as a graphic on the basis of said selected layout graphic data, and adding a second information relating to the radioactivity exposure amount for each partitioned area which is divided out of the area in which workers move for carrying out said target operation which is included for the calculation of said radioactivity exposure amount to said first information when said calculated radioactivity exposure amount does not satisfy the predetermined value, and said apparatus further being provided with;

said processing means outputting said operation procedures of said target operation which is included for the calculation of said radioactivity exposure amount and said first information with said second information being added on the basis of said processing procedures, and said displaying means displaying said operation procedures and said first information with said second information being added which have been outputted from said processing means.

24. An apparatus for supporting the operation under radioactive rays according to claim 18, wherein said second storing area stores said processing procedures including steps of;

generating the first information for displaying each structure in said area with controlled radioactive rays as a graphic using said layout graphic data, and adding a second information for displaying the surface radioactivity rate of each said structure to said first information, and said apparatus further being provided with;

said processing means outputting said operation procedures of said target operation which is included for the calculation of said radioactivity exposure amount and said first information with said second information being added on the basis of said processing procedures, and said displaying means displaying said operation procedures and said first information with said second information being added which have been outputted from said second processing means.

25. An apparatus for supporting in the operation under radioactive rays, characterized by being provided with:

an input unit, a first storing area storing layout graphic data in a state in which a plurality of structures are disposed in an area with controlled radioactive rays, a second storing area storing processing procedures for executing the steps of;

selecting layout graphic data relating to said area with controlled radioactive rays designated by the output of said input unit from said first storing area, generating the first information for displaying the structures in the area with controlled radioactive rays as a graphic on the basis of said layout graphic data, generating a plurality of condition approximation graphic data of worker approximators approximating the movements of workers carrying out a target operation including a plurality of operation procedures of said target operations which is outputted from said input unit, generating a second information for displaying said worker approximators carrying out said target operation as a graphic on the basis of said condition approximation graphic data, and calculating the radioactivity exposure amount of workers according to the movements of the graphic of said worker approximators, a processing means outputting said first information and second information which have been obtained on the basis of said processing procedures, and a displaying means displaying said first information and second information which have been outputted from said processing means.

26. An apparatus for supporting the operation under radioactive rays, characterized by being provided with:
- a storing means storing layout graphic data in a state in which a plurality of structures are disposed in an area with controlled radioactive rays,
- a structure graphic information generating means generating first information for displaying said structures in said designated area with controlled radioactive rays as a graphic on the basis on said layout graphic data selected from said storing means which is said layout graphic data relating to said designated area with controlled radioactive rays,
- a worker movement data generating means for generating a plurality of condition approximation graphic data of the worker approximators approximating the movements of the workers carrying out a target operation including a plurality of operation procedures of said target operation inputted,
- a target operation simulation information generating means for generating a second information for displaying a series of configuration of said worker approximators carrying out said target operation within said designated area with controlled radioactive rays,
- a radioactive ray information generating means for generating radioactive ray information of each structure body within said designated area with controlled radioactive rays based on the inputted radioactive ray data,
- an exposure radioactivity amount calculation means calculating the radioactivity exposure amount at the designated location within said worker approximators on the basis of said second information and said radioactive ray information,
- a means for outputting the information of the operation procedures of said target operation which is included for the calculation of said exposure amount when said calculated radioactivity amount satisfies a predetermined value, and
- a displaying means displaying said first and second information and the information of said operation procedures.

27. A method for supporting a target operation to be carried out within a radioactive environment comprising the steps of:
- generating and displaying layout graphic data of the radioactive environment including the structural arrangement of apparatus within the radioactive environment where the target operation is to be carried out;
- graphically simulating movement of at least one worker with respect to the displayed layout graphic data for performing an operation procedure of the target operation within the radioactive environment; and
- calculating a radioactivity exposure amount received by the at least one worker in accordance with the simulated movement of the at least one worker with respect to the displayed layout graphic data of the radioactive environment for performing the operation procedure of the target operation within the radioactive environment so as to determine whether the calculated radioactive exposure amount satisfies a predetermined value.

28. A method according to claim 27, wherein the predetermined value includes a time value for completion of the target operation.

29. A method according to claim 28, further comprising the step of selecting modifications of the target operation when the calculated radioactive exposure amount does not satisfy the predetermined time value of the target operation.

30. A method according to claim 27, further comprising the step of displaying locations of apparatus of the layout graphical data requiring a countermeasure against radioactivity exposure upon determining that the calculated radioactive exposure amount does not satisfy the predetermined value.

31. Apparatus for supporting a target operation to be carried out within a radioactive environment comprising:
- means for generating and for displaying layout graphic data of the radioactive environment including the structural arrangement of at least one of equipment and piping within the radioactive environment where the target operation is to be carried out;
- means for graphically simulating movement of at least one worker with respect to the displayed layout graphic data for performing an operation procedure of the target operation within the radioactive environment; and
- means for calculating a radioactivity exposure amount received by the at least one worker in accordance with the simulated movement of the at least one worker with respect to the displayed layout graphic data of the radioactive environment for performing the operation procedure of the target operation within the radioactive environment and for determining whether the calculated radioactive exposure amount satisfies a predetermined value.

32. Apparatus according to claim 31, wherein the predetermined value includes a time value for completion of the target operation.

33. Apparatus according to claim 32, further comprising means for selecting modifications of the target operation when the means for calculating and for determining determines that the calculated radioactive exposure amount does not satisfy the predetermined time value of the target operation.

34. Apparatus according to claim 31, wherein the means for generating and for displaying includes location display means for displaying locations of at least one of the equipment and piping requiring a countermeasure against radioactivity exposure upon the means for calculating and for determining that the calculated radioactive exposure amount does not satisfy the predetermined value.

* * * * *